United States Patent [19]

Kojima et al.

[11] Patent Number: 5,319,506
[45] Date of Patent: Jun. 7, 1994

[54] TAPE RECORDING AND/OR REPRODUCING APPARATUS WITH ULTRASONICALLY VIBRATED TAPE GUIDES

[75] Inventors: Toshiaki Kojima; Hiroshi Kiriyama; Etsuro Saito, all of Kanagawa, Japan

[73] Assignee: Sony Corporation, Tokyo, Japan

[21] Appl. No.: 857,995

[22] Filed: Mar. 26, 1992

[30] Foreign Application Priority Data

Mar. 29, 1991 [JP] Japan .................................. 3-066914

[51] Int. Cl.⁵ ....................... G11B 15/60; B65H 27/00
[52] U.S. Cl. .................................. 360/73.05; 226/196; 242/186
[58] Field of Search ..................... 360/71, 73.05, 73.06, 360/130.21; 226/196; 242/76, 157.1, 186

[56] References Cited

U.S. PATENT DOCUMENTS

| | | | |
|---|---|---|---|
| 4,875,610 | 10/1989 | Kitamoto et al. | 226/10 |
| 5,152,444 | 10/1992 | Saito | 226/196 |

FOREIGN PATENT DOCUMENTS

| | | |
|---|---|---|
| 0100284 | 2/1984 | European Pat. Off. |
| 0386712A3 | 9/1990 | European Pat. Off. |
| 3336921C1 | 5/1985 | Fed. Rep. of Germany |

OTHER PUBLICATIONS

Soviet Inventions Illustrated Section EI, Week 8138, Derwent Publications Ltd., London, FB; Class T, AN J8058 and SU-A-781 953 (Kaun Poly).
Soviet Inventions Illustrated Section EI, Week 8102, Derwent Publications Ltd., London, GB; Class T, AN A1667 and SU-A-732 992 (Kaun Poly).
Soviet Invention Illustrated Section Ei, Week 8247, Derwent Publications Ltd., London, GB; Class T, AN MO914 and SU-A-801 085 (Phys Cult Res Inst).

Primary Examiner—Louis J. Casaregola
Attorney, Agent, or Firm—William S. Frommer; Alvin Sinderbrand

[57] ABSTRACT

In an apparatus for recording and/or reproducing signals on a tape and which is selectively operative in a plurality of modes, such as, a normal recording or playback mode, a fast-forward mode, a re-wind mode and a jog mode; the tape is driven between supply and take-up reels at speeds characterizing the selected mode while being guided by a guide element which is ultrasonically vibrated for reducing the frictional resistance to movement of the tape, and the frequency and power of an ultrasonic drive signal employed for vibrating the guide element are controlled so as to obtain optimal reduction of the frictional resistance to movement of the tape while minimizing power consumption.

37 Claims, 21 Drawing Sheets

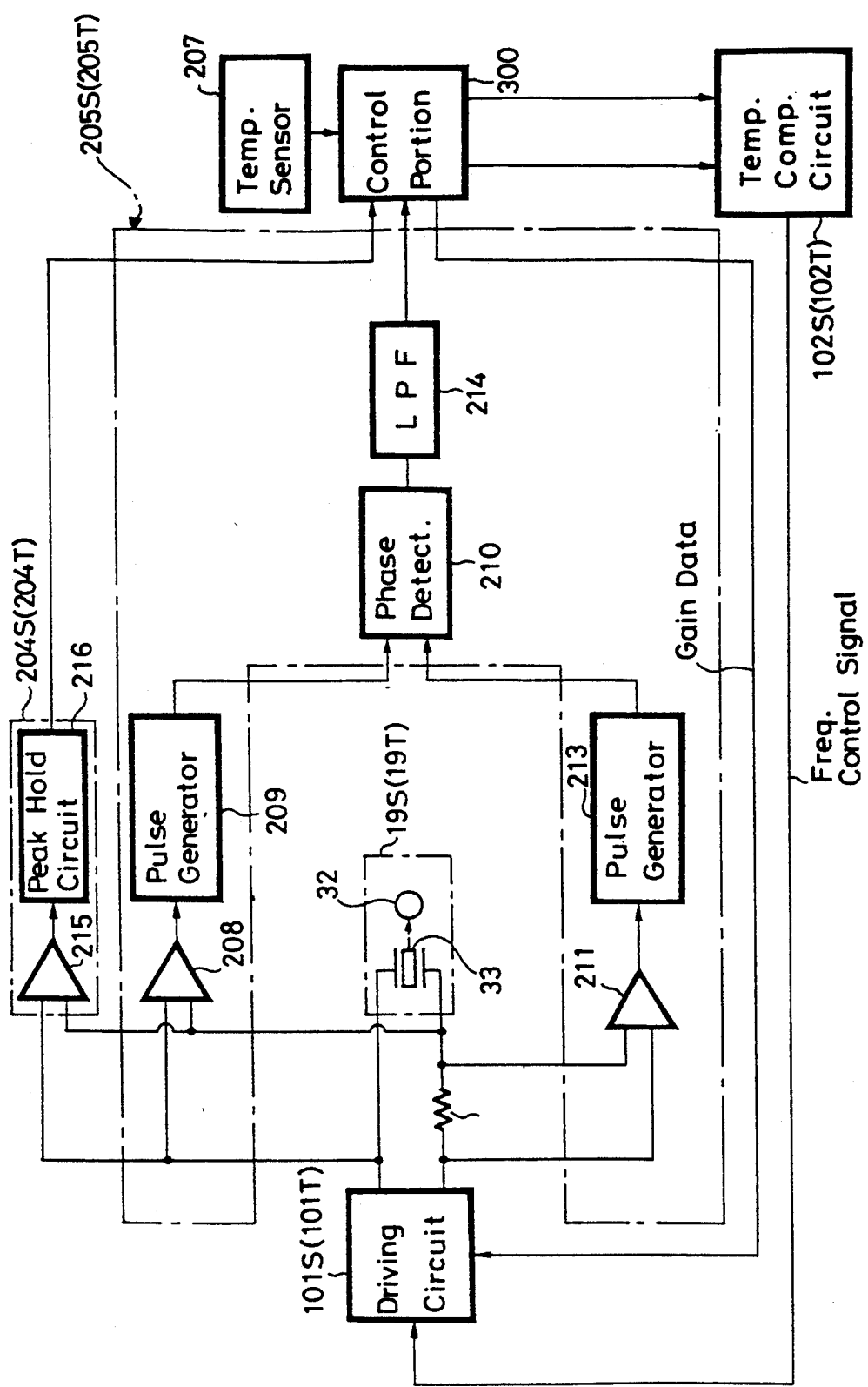
F I G. 10

F I G. 12
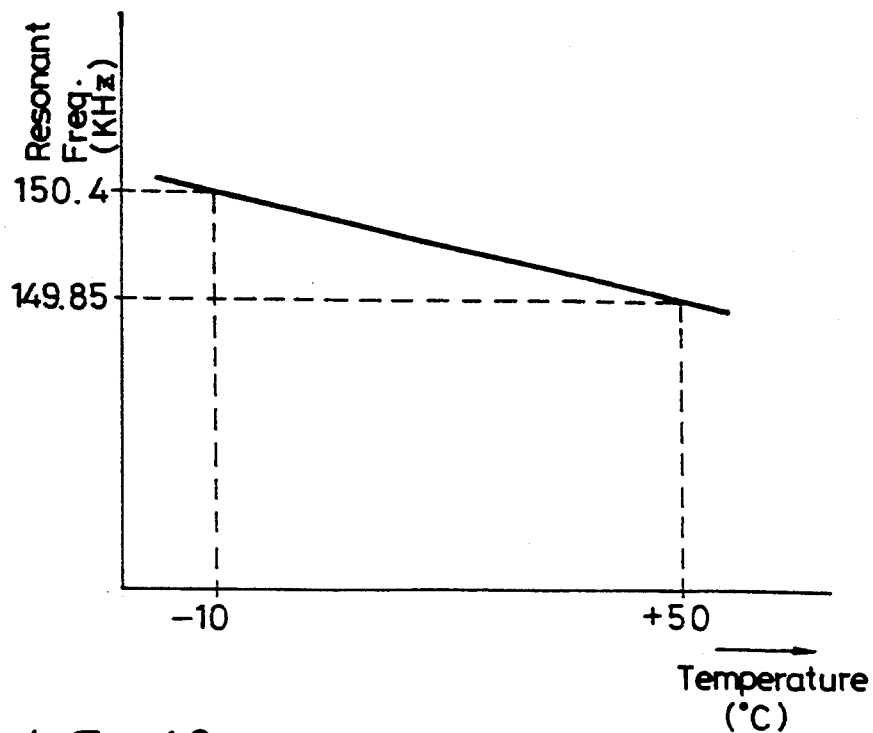
F I G. 18
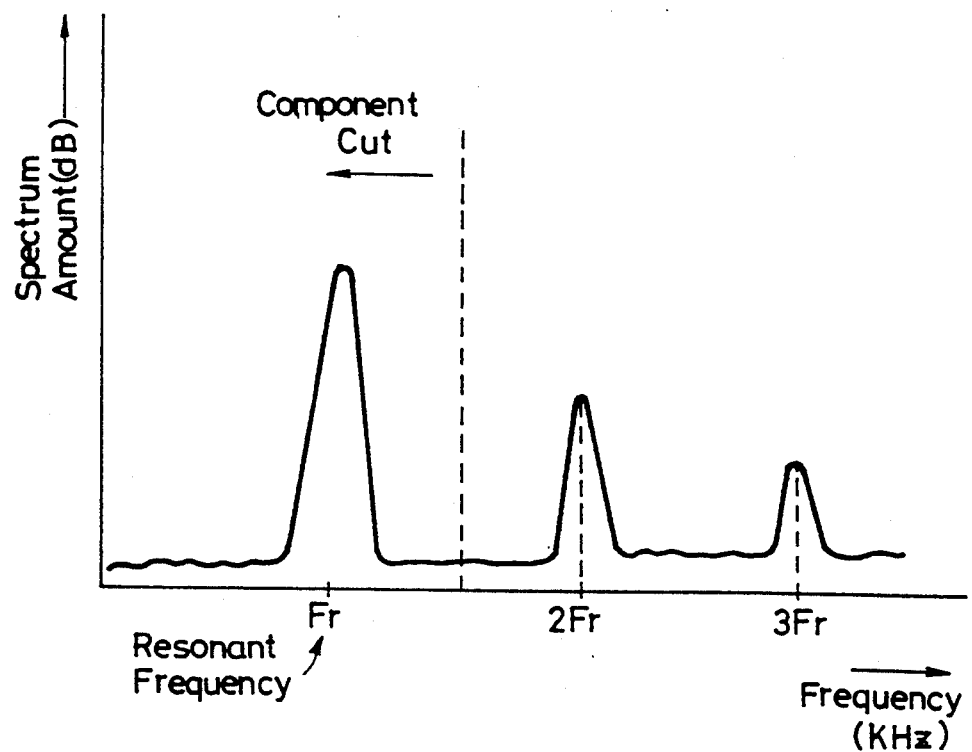

TAPE RECORDING AND/OR REPRODUCING APPARATUS WITH ULTRASONICALLY VIBRATED TAPE GUIDES

BACKGROUND OF THE INVENTION

This invention relates generally to tape recording and/or reproducing apparatus suitably for use as, for example, a video tape recorder (VTR).

In a VTR, a tape wound on supply and take-up reels is guided therebetween so as to be engageable by rotary heads associated with a guide drum for recording and reproducing video signals in tracks scanned on the tape which is wrapped about the periphery of the guide drum. Tape guides used for leading the tape to and from the guide drum are generally of the rotary-type or fixed-type. The rotary-type tape guides have the advantage of providing a relatively small resistance to the movement of the tape therepast. However, any irregularity in the bearing used for rotatably supporting the tape guide roller will cause corresponding irregularity in the running of the guided tape. Further, the tape has to run at right angles to the rotational axis of the rotary guide roller, as any deviation of the rotational axis from a precise perpendicular to the longitudinal direction of the tape will cause the tape to move transversely as it travels past the rotary guide roller. Such transverse movement of the tape will bring a longitudinal or side edge of the tape into bearing engagement with a flange provided on the guide roller, whereby the flange will crumple or otherwise damage the edge portion of the tape. Therefore, when rotary tape guides are used, the guides and the structures employed for mounting and positioning the same must be produced and assembled with very high precision, with the result that such guides are difficult and expensive to produce.

On the other hand, if fixed or non-rotatable guides are used to avoid the foregoing problems, the tape guides impose an undesirably large frictional resistance to the movement of the tape. In an attempt to minimize the frictional resistance to movement of the tape past non-rotatable guides, it has been proposed to employ a so-called "air guide", that is, a non-rotatable tape guide having perforations in its surface through which jets of air are propelled for establishing an air film between the tape and the guide surface. Although the described air guides provide a reduced frictional resistance to the movement of the tape, an air compressor or other source of air under pressure is required and introduces further complexity in the associated VTR.

In order to solve the foregoing problems, one of the inventors hereof has proposed, for example, as disclosed specifically in U.S. patent application Ser. No. 07/489,043, filed Mar. 5, 1990, and having a common assignee herewith, a non-rotary tape guide device in which a guide element is subjected to ultrasonic vibration so as to impose small frictional resistance to the travel of the tape while guiding the tape in a stable manner without the danger of inflicting damage thereto. Other ultrasonic tape guide elements are described in commonly owned U.S. application Ser. No. 07/841,045, filed Feb. 25, 1992, now U.S. Pat. No. 5,263,624 and U.S. application Ser. No. 07/856,174, filed Mar. 23, 1992, now U.S. Pat. No. 5,224,643.

Although it may seem relatively simple to provide the necessary ultrasonic energy for effecting vibration of the tape guide, there are problems associated therewith. More specifically, the frequency of the ultrasonic energy applied to the guide element for effecting the ultrasonic vibration thereof should be a resonant frequency of the guide element However, such resonant frequency changes with temperature. Further, the amplitude or power of the ultrasonic energy required for effecting ultrasonic vibration of the guide element so as to achieve the desired reduction of the frictional resistance to movement of the guided tape varies with tape speed. In fact, when the tape runs at very high speeds, for example, as in the fast-forward or rewind mode, an air film is drawn between the surface of the guide element and the tape so that the frictional resistance to movement of the tape is sufficiently reduced by such air film and ultrasonic vibration of the guide element is not then required. Accordingly, generation of the ultrasonic energy for vibrating the guide element at a constant power level results in wasteful power consumption.

OBJECTS AND SUMMARY OF THE INVENTION

Accordingly, it is an object of this invention to provide a tape recording and/or reproducing apparatus having ultrasonically vibrated tape guides, and which avoids the previously mentioned disadvantages or problems associated with the prior art.

More specifically, it is an object of this invention to provide a tape recording and/or reproducing apparatus having ultrasonically vibrated tape guides, and which attains optimal reduction of the frictional resistance to movement of the tape relative to the guides while minimizing the power consumed for that purpose.

It is another object of this invention to provide a tape recording and/or reproducing apparatus with ultrasonically vibrated tape guides, as aforesaid, in which the frequency of the ultrasonic energy for vibrating each tape guide element is varied with changes in temperature so as to remain substantially at the resonant frequency of the guide element.

It is still another object of the invention to provide a tape recording and/or reproducing apparatus with ultrasonically vibrated tape guides, as aforesaid, and in which the power of the ultrasonic energy is changed in accordance with changes in the tape speed, for example, as when changing from one to another of the various operating modes of the apparatus.

It is a further object of this invention to provide a tape recording and/or reproducing apparatus with ultrasonically vibrated tape guides, as aforesaid, and in which defective operation or malfunctioning of the tape guides is automatically indicated.

In accordance with an aspect of this invention, an apparatus which is selectively operative in a plurality of operating modes for recording and/or reproducing signals on a tape while the latter is longitudinally transported between supply and take-up means at speeds determined in accordance with the operating modes, further comprises: at least one guide element having a surface slidably engageable by the tape for guiding the latter, ultrasonic oscillation generating means connected with the guide element and being operable for effecting ultrasonic vibration of the guide element so as to reduce frictional resistance to movement of the tape across the surface of the guide element, drive circuit means for supplying an ultrasonic sine-wave drive signal to the oscillation generating means for operating the latter, and control means for controlling the power of the drive signal in accordance with one of the operating modes selected for operation of the apparatus so as to obtain optimal reduction of the frictional resistance to movement of the tape while minimizing power consumption by the drive circuit means. Thus, for example, in the case where the operating modes of the apparatus include normal recording and reproducing modes in each of which the tape is transported at a relatively slow, constant normal speed, the control means establishes a relatively high level of the drive signal power upon initiation of either the normal recording or reproducing mode and during acceleration of the tape up to the normal speed, whereupon the control means reduces the power to a relatively lower level during the following transportation of the tape at the constant normal speed. In the case where the operating modes further include a jog mode, the control means establishes another high level of the drive signal power upon change-over from the normal recording or reproducing mode to the jog mode, for ensuring a further reduction of the frictional resistance to movement of the tape during the quick changes in the speed and direction of tape movement characteristic of the jog mode. Furthermore, in the case where the operating modes include a fast-forward and a rewind mode in each of which the tape is accelerated to a speed higher than that at which a film of air is drawn between the tape and the surface of the guide element, the control means establishes a relatively high level of the drive signal power upon initiation of either the fast-forward or rewind mode, and then reduces such power during acceleration of the tape up to the speed at which the air film is first formed, whereupon the drive circuit means is made ineffective to operate the oscillation generating means.

In accordance with another aspect of this invention, a tape recording and/or reproducing apparatus as generally described above has its control means programmed to initially scan the frequency of the ultrasonic sinewave drive signal, and the resonant frequency of the tape guide element is determined to be the scanned frequency at which the maximum amplitude of the drive signal is detected.

The above, and other objects, features and advantages of this invention, will be apparent in the following detailed description of illustrative embodiments thereof which is to be read in connection with the accompanying drawings forming a part hereof, and in which corresponding elements and components are similarly identified in the several views.

BRIEF DESCRIPTION OF THE DRAWINGS

FIG. 10 is a block diagram showing details of a phase detecting circuit that may be employed in the circuit of FIG. 4;

FIG. 12 is a graph showing the relation between resonant frequency and temperature, and to which reference will be made in explaining the operation of the temperature compensation circuit shown on FIG. 11;

FIG. 18 is a graph illustrating the spectrum of a drive signal that is characteristic of a defective connection between a guide element and an oscillation generator which receives the drive signal and is normally securely attached to the guide element for vibrating the latter;

DETAILED DESCRIPTION OF THE PREFERRED EMBODIMENTS

Figure 1:
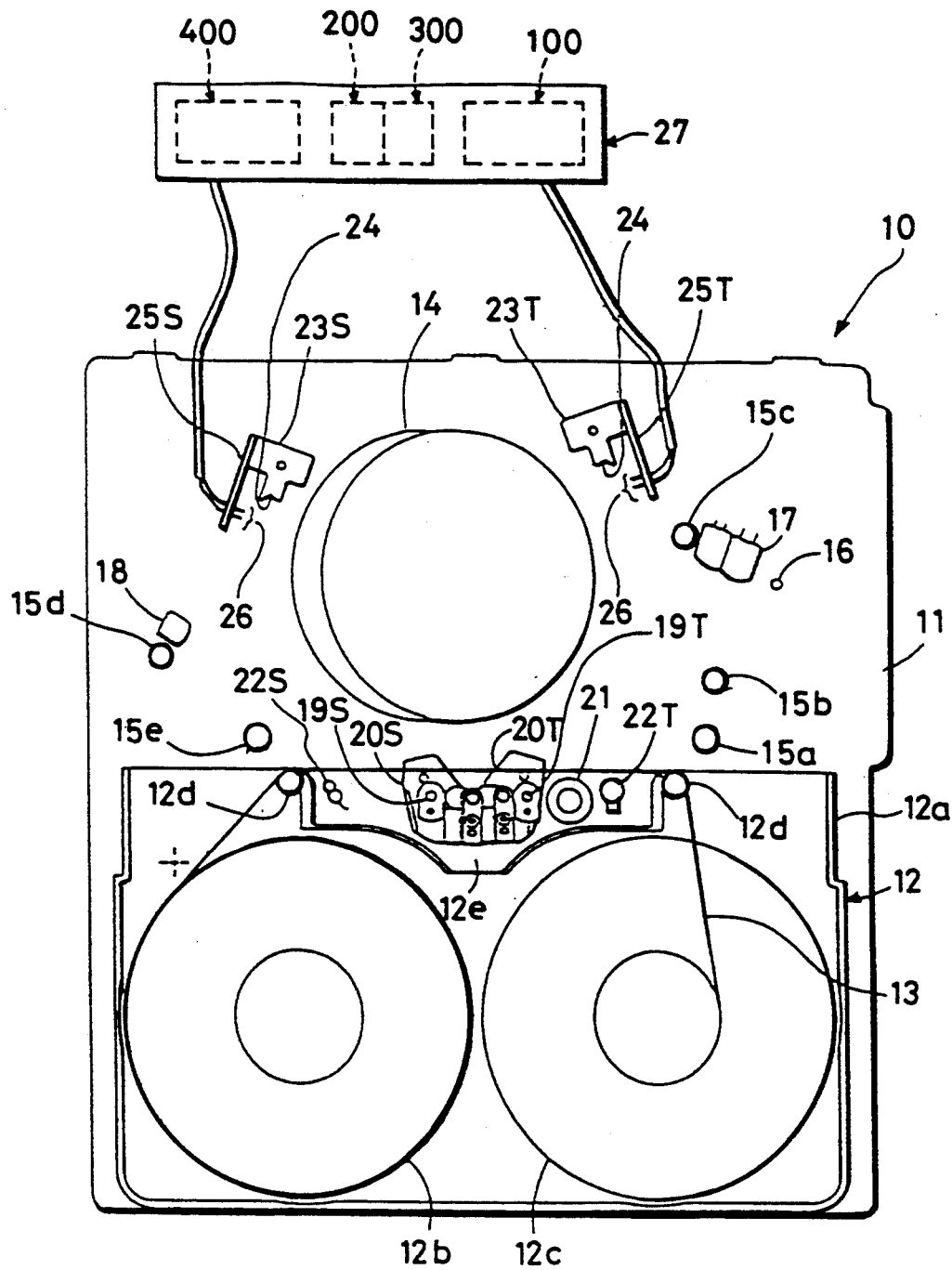
FIG. 1 is a schematic plan view of a tape recording and/or reproducing apparatus according to an embodiment of the present invention, and which is shown with a tape in its unloaded condition.

Referring to the drawings in detail, and initially to FIG. 1 thereof, it will be appreciated that the present invention may be applied to various types of tape recording and/or reproducing apparatus, such as, VTRs employing any one of the D-2 digital, Beta VHS or 8 mm. formats, and is shown applied to a video cassette recorder (VCR) 10, that is, a VTR intended for use with a tape cassette 12. The illustrated VCR 10 is shown to include a base 11 on which the conventional tape cassette 12 is suitably positioned. Such cassette 12 is shown to have a casing 12a, a supply reel 12b and a take-up reel 12c rotatably disposed within the casing 12a and on which a tape 13 is wound, and guides 12d within the casing 12a at opposite ends of a recess 12e provided in a front portion of the cassette casing 12a and by which the tape extending between the reels 12b and 12c is guided to extend across the open front of the recess 12e when the cassette 12 is not in use.

Figure 2:
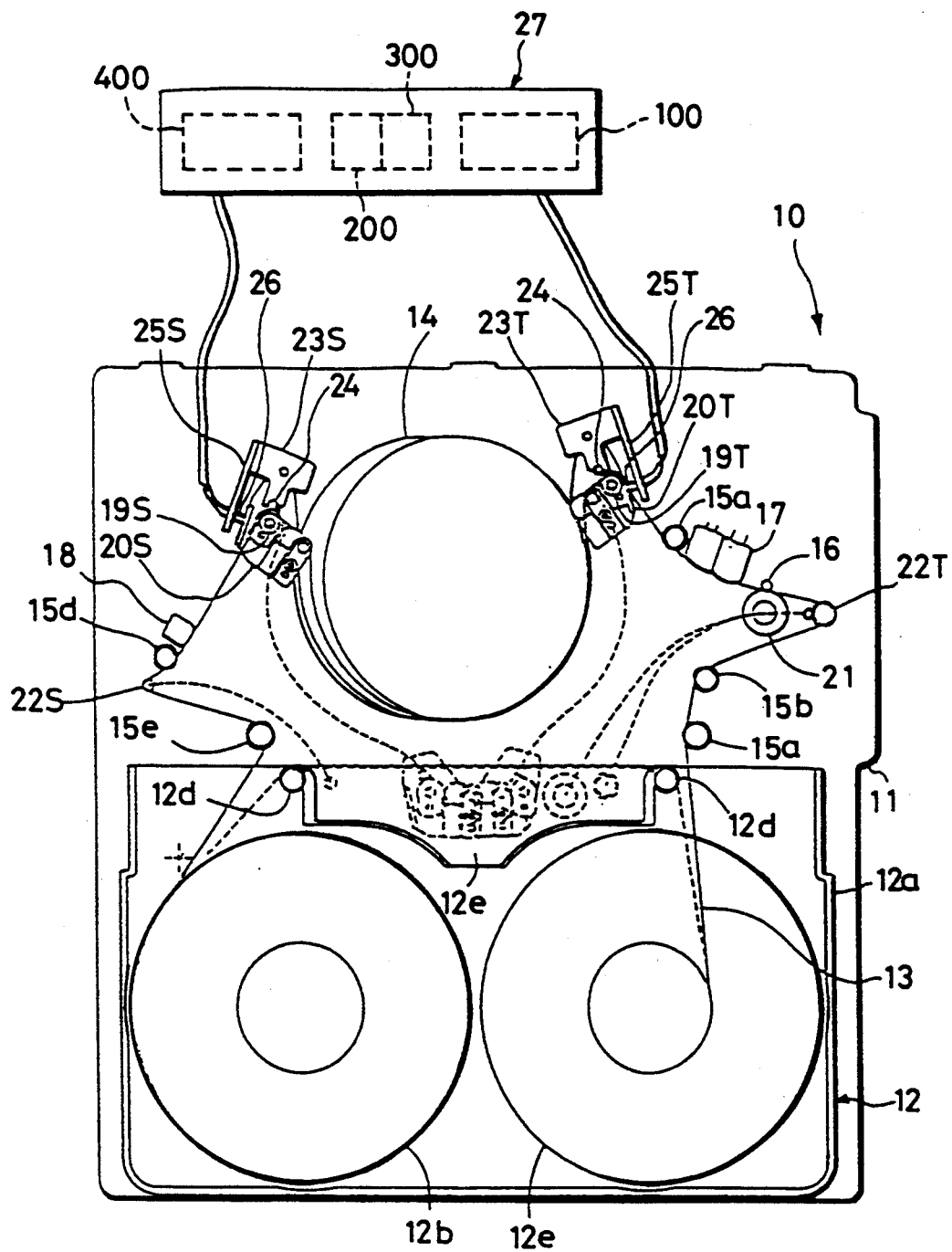
FIG. 2 is a view similar to that of FIG. 1, but with the apparatus shown in its loaded condition in preparation for a recording or reproducing operation.

The VCR 10 may conventionally employ a so-called "M-loading" operation for withdrawing the tape 13 from within the cassette casing 12a operatively positioned on the base 11 and wrapping the withdrawn tape in a helical fashion about a tilted rotary head drum 14 mounted on the base 11, as shown in full lines on FIG. 2. The head drum 14 conventionally has rotary heads (not shown) associated therewith for recording/reproducing video or other information signals in slant tracks on the tape wrapped about the drum. Also mounted on the base 11 are suitably positioned fixed tape guides 15a, 15b, 15c, 15d and 15e, a capstan 16, a fixed record/reproduce head 17 employed, for example, for recording and reproducing an audio signal in a longitudinal track on the tape, and an erasing head 18.

The M-loading operation is conventionally effected, in part, by tape guiding devices 19S and 19T mounted on suitably guided slides 20S and 20T, respectively, for movement between initial positions, shown in full lines on FIG. 1, where the tape guiding devices 19S and 19T extend upwardly into the recess 12e of the operatively positioned cassette in back of the run of the tape 13 extending across such recess, and operative positions, indicated in full lines on FIG. 2, and at which the tape guiding devices 19S and 19T guide the withdrawn tape 13 to and from the surface of the rotary head drum 14.

The VCR 10 is further shown to include a pinch roller 21 and moveable tape tensioning guides 22S and 22T suitably mounted for movement between initial positions, shown in full lines on FIG. 1, where the pinch roller 21 and tape tensioning guides 22S and 22T also extend upwardly into the recess 12e of the operatively positioned tape cassette 12, and operative positions, indicated in full lines on FIG. 2, and at which the pinch roller 21 presses the withdrawn tape against the capstan 16 so as to be longitudinally transported by the latter, and the tape tensioning guides 22S and 22T form respective bights in the withdrawn tape and are moveable in response to changes in the tape tension, as hereinafter described in greater detail. The movements of the pinch roller 21 and the guides 22S and 22T between their respective initial and operative positions are suitably coordinated with the M-loading operation.

Stoppers 23S and 23T are shown mounted on the base 11 adjacent the rotary head drum 14 and have notches 24 engageable by the slides 20S and 20T in the operative positions of the latter for accurately positioning the tape guiding device 19S and 19T relative to the surface of the rotary head drum 14. Connectors 25S and 25T extend from the stoppers 23S and 23T and have terminal pins 26 projecting therefrom so that AC voltage drive signals can be supplied from a circuit board 27 of the VCR 10 through the terminal pins 26 to the tape guiding devices 19S and 19T when the latter are in their operative positions shown on FIG. 2.

Figure 6:
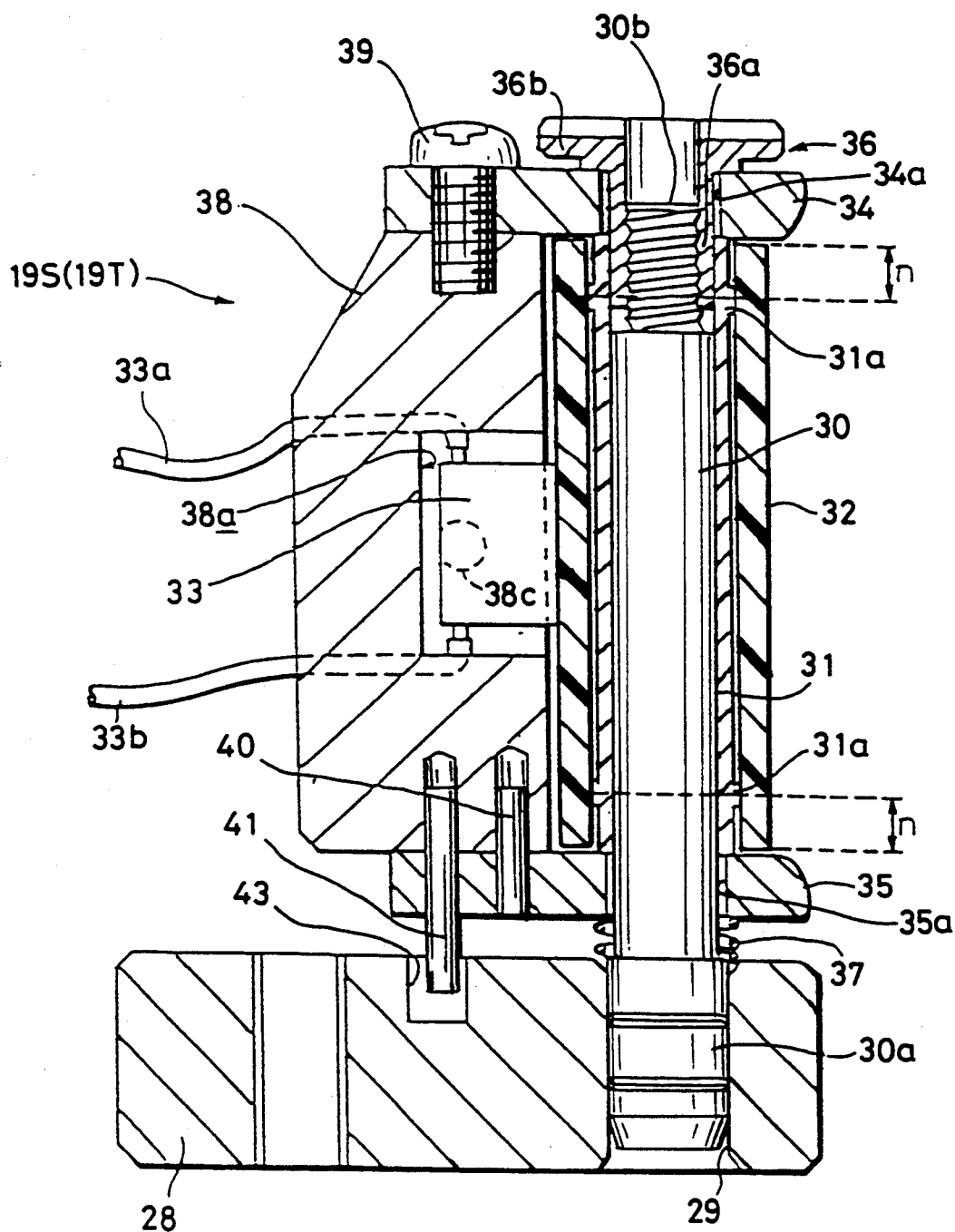
FIG. 6 is an enlarged sectional view of an ultrasonically vibrated tape guide device that may be employed in a tape recording and/or reproducing apparatus embodying the present invention.
Figure 7:
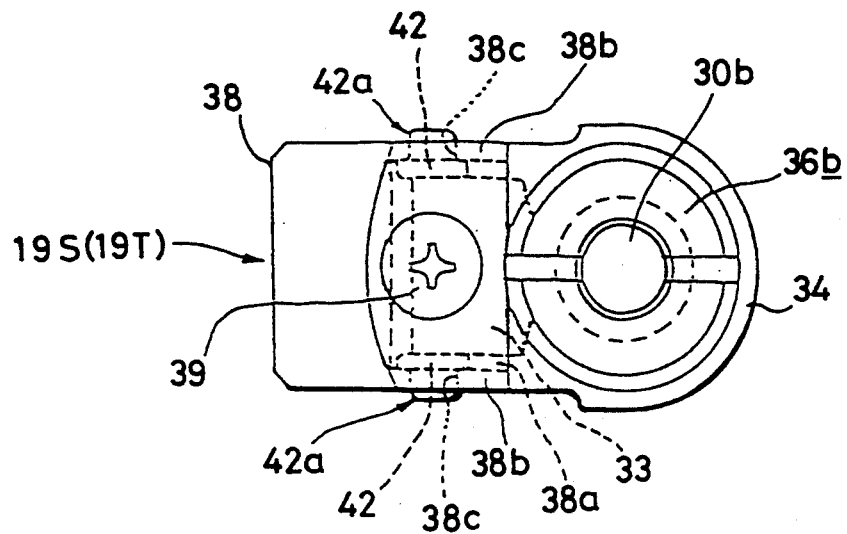
FIG. 7 is a top plan view of the guide device shown in FIG. 6.

As shown on FIGS. 6 and 7, each of the tape guiding devices 19S and 19T may include a base 28 which is mounted on or constitutes the respective slide 20S or 20T, and which has a bore 29 formed therein to fixedly receive a lower end portion 30a of a support shaft 30 which further has a reduced diameter, threaded upper end portion 30b. A cylindrical bushing 31 of brass is slidable on the support shaft 30 and has annular ridges 31a extending from its outer surface at axial distances n from the upper and lower ends of the bushing 31. A tubular tape guide element 32 of metal or ceramic is diametrically dimensioned to extend around the bushing 31 and to engage the latter only at the regions of the annular ridges 31a. An ultrasonic oscillation generator or vibrator 33 is fixed to the guide element 32 and may be formed of a stack of piezo electric ceramic plates with positive and negative electrodes alternately interposed between the successive ceramic plates. The positive electrodes are electrically connected to a positive electrode plate provided at one side surface of the stack of ceramic plates, while the negative electrodes are electrically connected to a negative electrode plate provided at the other side surface of the stack of ceramic plates. The end surfaces of the ceramic plates at one end of the ultrasonic vibrator 3 are suitably contoured and bonded to the cylindrical outer surface of the guide element 32 midway between the ends of the latter, and the opposite end surfaces of the ceramic plates are covered by an insulating member. The positive-electrode plate of the ultrasonic vibrator 33 is connected with a positive lead 33a, and the negative-electrode plate of the vibrator 33 is similarly connected with a negative lead 33b.

An upper flange 34 and a lower flange 35 bear against the upper and lower end edges, respectively, of the bushing 31. An adjusting nut 36 has an internally threaded barrel 36a screwed on the reduced diameter threaded end portion 30b of the support shaft 30, and a slotted head 36b at the upper end of the barrel 36a. The outer surface of the barrel 36a is dimensioned so that such barrel 36a can freely turn within the bushing 31. The upper and lower flanges 34 and 35 have bores 34a and 35a extending therethrough which are diametrically dimensioned to loosely receive the barrel 36a of the adjusting nut 36 and the supporting shaft 30, respectively. A helical compression spring 37 extends around the shaft 30 between the base 28 and the lower flange 35 for urging the latter upwardly. A mounting member 38 is fixed, at its upper end, to the upper flange 34 by means of screw 39, and the lower flange 35 is fixed to the bottom of the mounting member 38, as by pins 40 and 41. The mounting member 38 maintains the upper and lower flanges 34 and 35 in parallel relationship with the spacing therebetween being approximately 0.1 mm larger than the axial length of the tubular guide element 32 so as to avoid interference with vibration of the latter. Further, a cavity 38a is formed within the mounting member 38 and opens toward the guide element 32 between side walls 38b so as to accommodate the ultrasonic vibrator 33 within such cavity. The side walls 38b have small holes 38c extending therethrough to receive, and thereby position, projections 42a extending from disc-like rubber stoppers 42 disposed between side walls 38b and the adjacent sides of the ultrasonic vibrator 33. It will be appreciated that the stoppers 42 prevent the ultrasonic vibrator 33, and hence the tubular guide element 32 bonded thereto, from rotating about the support shaft 30 relative to the assembly of the mounting member 38 and the flanges 34 and 35. Further, the pin 41 is shown on FIG. 6 to depend substantially from the lower flange 35 and to be received in a hole 43 in the top surface of the base 28 for preventing turning of the mounting member 38 and flanges 34 and 35 while permitting vertical adjustment thereof relative to the base 28. Thus, when the adjusting nut 36 is turned and thereby moves vertically on the threaded end portion 30b of the support shaft 30, the assembled together mounting member 38, flanges 34 and 35, bushing 31 and guide element 32 are similarly vertically moved as a unit against the biasing force of the spring 37. Accordingly, the height of the tape guiding surface of the guide element 32 between the flanges 34 and 35 can be adjusted.

It will be appreciated that, when the ultrasonic vibrator 33 is energized by a suitable ultrasonic AC voltage drive signal, preferably having a frequency equal to a resonant frequency of the tubular guide element 32 directly bonded thereto, a standing wave oscillation is generated in the guide element 32 having nodes at the locations of the annular ridges 31a where the guide element 32 is positioned relative to the bushing 31 and support shaft 30. In other words, the distance n from the ends of the bushing 31 to the annular ridges 31a is selected so as to position such ridges 31a at nodes of the standing wave vibration generated in the guide element 32.

Figure 8:
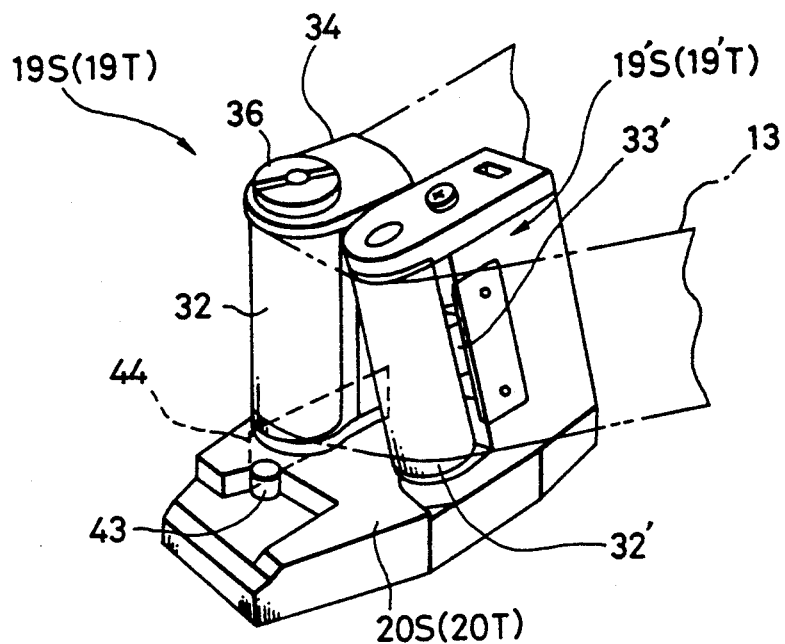
FIG. 8 is perspective view showing another ultrasonically vibrated tape guide device that may be used in the apparatus embodying this invention.

When the tape 13 is wrapped helically about the rotary head drum 14, as previously described, it is necessary to change the direction of the tape between each of the tape guiding devices 19S and 19T and the rotary head drum 14. As shown on FIG. 8, a slanting tape guiding device 19'S or 19'T can be combined with the tape guiding device 19S or 19T, respectively, on the same slider 20S or 20T. Each of the slanting tape guiding devices 19'S or 19'T is generally similar to the previously described tape guiding devices 19S and 19T in that it includes a tubular tape guide element 32' in which an ultrasonic standing wave oscillation is produced in response to operation of a respective ultrasonic vibrator 33'. As further shown on FIG. 8, a locating pin 43 may be provided on each of the sliders 20S and 20T for engagement in the notch 24 of the respective stopper 23S or 23T at the completion of the M-loading operation. Further, a printed terminal circuit board 44 (shown in broken lines on FIG. 8) is desirably provided on each of the sliders 20S and 20T for engagement with the terminal pins 26 on the respective connector 25S or 25T at the completion of the M-loading operation, whereupon, the ultrasonic vibrators 33 can be suitably energized for effecting ultrasonic vibration of the tape guide elements 32 and 32' and thereby reducing the frictional resistance to movement of the tape 13 across the surfaces of such guide elements.

Figure 22:
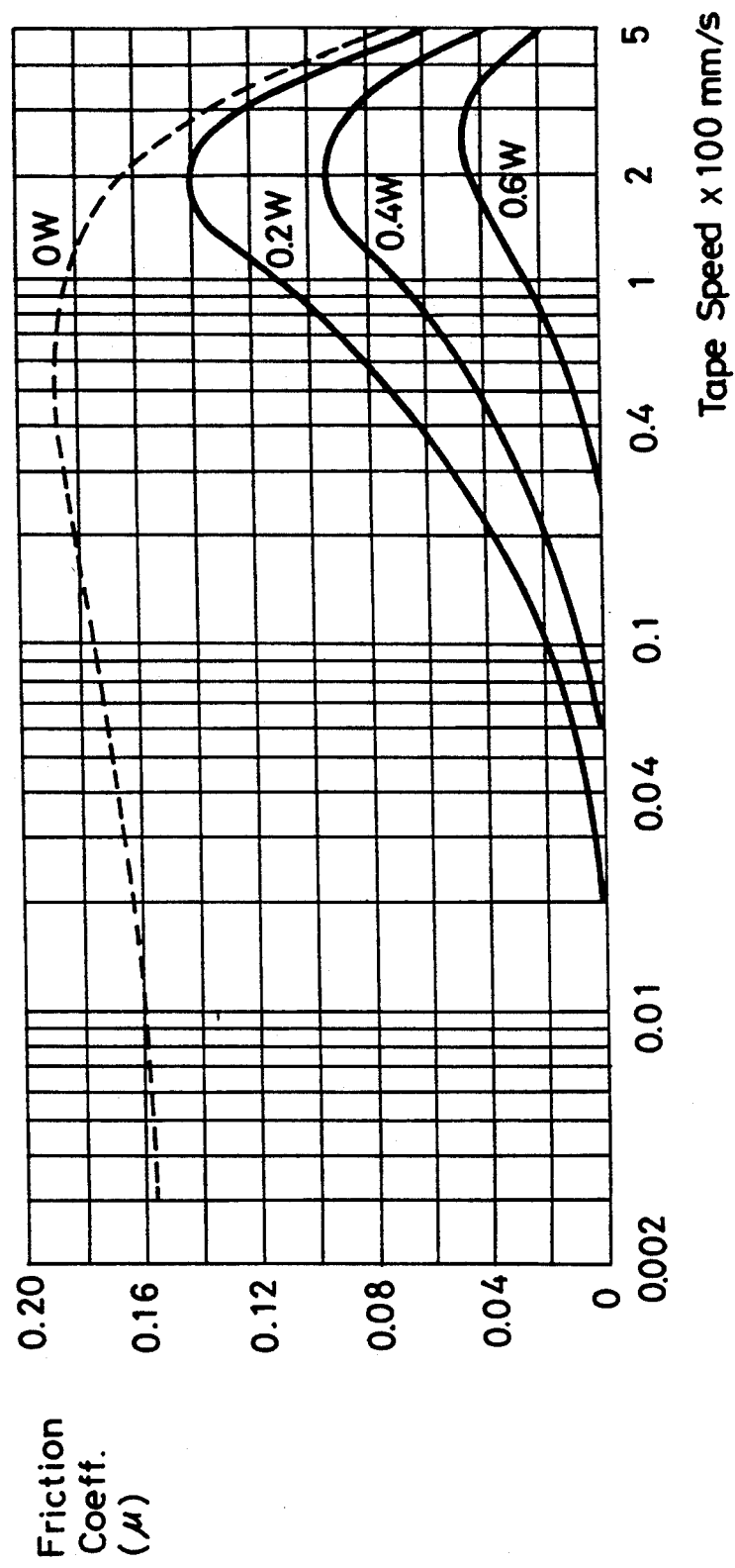
FIG. 22 is a graph showing the relation of friction coefficient to tape speed for various power levels of the ultrasonic energy used for vibrating a tape guide element in the apparatus embodying the present invention.

As will be apparent from FIG. 22 which shows the relation between the coefficient of friction of the tape in respect to the surface of the tape guide element 32 or 32' for different speeds of the tape when the power of the drive signal applied to the ultrasonic vibrator 33 or 33' is at various levels, when the tape speed is low, for example, below 10 mm/sec., a large reduction in the coefficient of friction is realized when the power of the drive signal is raised only a small amount from 0 W to even 0.2 W. When the tape speed is increased, for example, to 100 mm/sec, a comparable reduction in the coefficient of friction requires that the level of the drive signal power be further raised, for example, to 0.6 W. Further, when the tape speed is high, for example, above 500 mm/sec., the coefficient of friction is sharply reduced even if the ultrasonic vibrator 33 or 33' is inoperative, as is represented by the dotted curve labeled 0 W on FIG. 22. At such high tape speed, air is drawn in between the tape and the surface of the guide element 32 or 32' to form an air film therebetween which substantially reduces the coefficient of friction even in the absence of any vibration of the guide element. If, as in the prior art, the power of the drive signal applied to the ultrasonic vibrator 33 or 33' is not changed in accordance with changes in the tape speed either inadequate reduction of the frictional resistance to movement of the tape is attained, or there is wasteful consumption of energy in effecting unnecessary vibration of the tape guide elements.

Moreover, a VCR of the type indicated at 10 on FIGS. 1 and 2 has a number of operating modes, such as, a fast-forward mode and a rewinding mode, in which the tape is longitudinally transported between the supply and take-up reels 12b and 12c at a speed at least several times greater than the normal tape speed used in the signal recording and reproducing or playback modes. If the power used for driving the ultrasonic vibrator 33 or 33' of the tape guiding device is not changed upon change-over of the VCR from one of its operating modes to another, as in the prior art, there will be either inadequate reduction of the frictional resistance to movement of the tape or wasteful consumption of energy in effecting vibration of the tape guide elements when such vibration is not necessary. Furthermore, in the fast-forward mode of operation, the time required for transferring tape from the supply reel 12b to the take-up reel 12c can be reduced by increasing the acceleration of the tape from a condition of rest or from the normal tape speed up to the high tape speed used in the fast-forward mode. However, increasing the acceleration of the tape correspondingly increases the tape tension resulting from the frictional resistance to movement of the tape in the low speed range, that is, below 500 mm/sec., as shown in FIG. 22. Although such tape tension can be reduced by employing ultrasonic vibration of the tape guide elements for reducing the frictional resistance to movement of the tape in the relatively low speed range, the frictional coefficient is decreased, even in the absence of ultrasonic vibration of the guide elements, in the high speed range, as previously described, so that such ultrasonic vibration is not then necessary. In other words, if the power of the drive signal for effecting ultrasonic vibration of the tape guide elements is not varied with time during a fast-forward operation, as in the prior art, either tape tension will become excessive during high acceleration in the low speed range, or there will be wasteful consumption of energy by continuing vibration of the tape guide elements in the high speed range.

Figure 23:
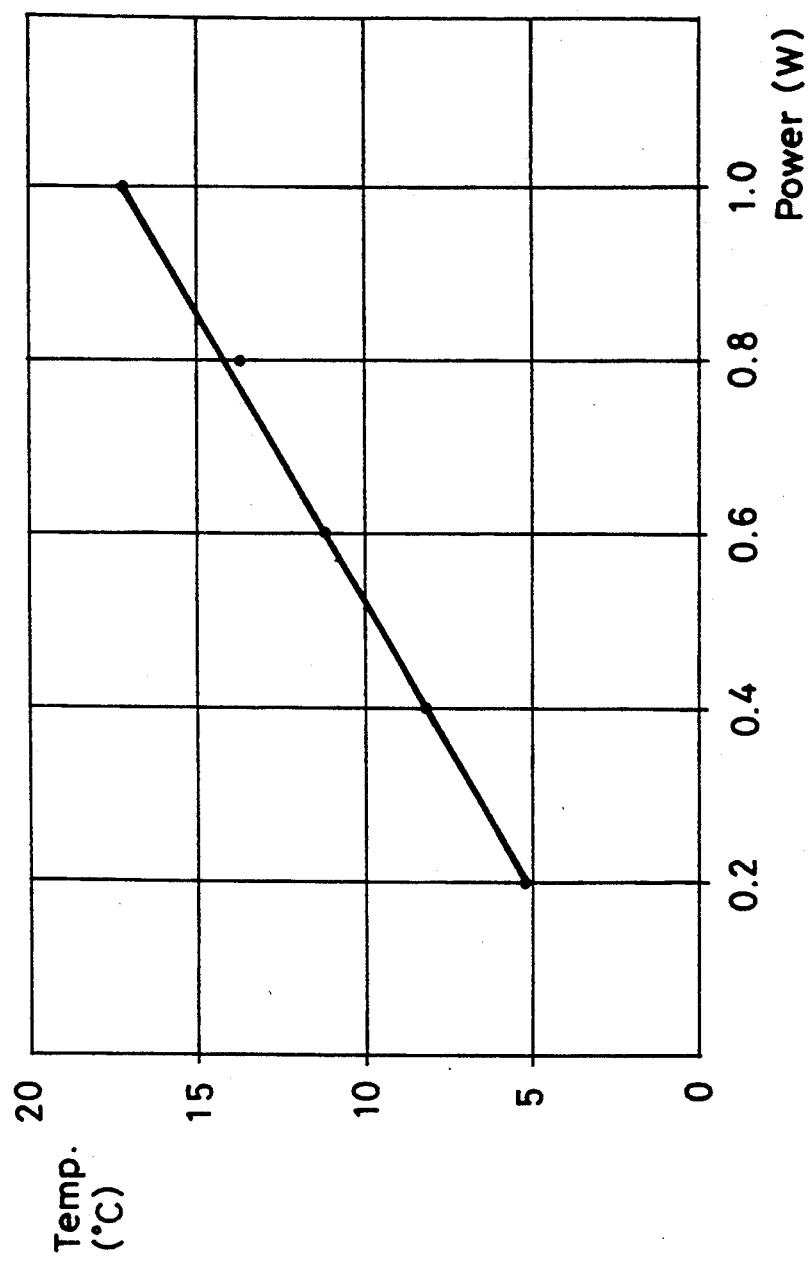
FIG. 23 is a graph showing the change in temperature of the ultrasonically vibrated tape guide device as the power of the ultrasonic energy for effecting ultrasonic vibration of the guide element is changed in accordance with the present invention.

Further, as shown on FIG. 23, the temperature of the vibrator 33 or 33' changes with changes in the power of the drive signal applied thereto and, as shown on FIG. 12, the resonant frequency of the vibrated guide element 32 or 32' fixed to the vibrator varies with changes in its temperature. Since the reduction of the coefficient of friction is most pronounced when the guide element 32 or 32' is vibrated at its resonant frequency, it is apparent that the failure to compensate for temperature changes, as in the prior art, sacrifices the attainment of the optimal reduction of frictional resistance to movement of the tape.

Generally, in the VCR 10 according to this invention, optimal reduction of the frictional resistance to movement of the tape is obtained while minimizing power consumption for driving the ultrasonically vibrated tape guide elements by controlling the frequency of vibration on the basis of temperature changes, and by controlling the power level of the drive signal for effecting such ultrasonic vibration on the basis of the selected operating mode of the VCR and further on the basis of the tape speed. In order to effect such control, the circuit board 27 of the VCR 10 is shown to include a driving portion 100 for providing ultrasonic drive signals to the vibrators 33s and 33t of the tape guiding devices 19S and 19T, respectively, a detecting portion 200 detecting various operating characteristics of the VCR 10, and particularly of its driving portion 100, and a control portion 300 which, as hereinafter described in detail, responds to signals from the detecting portion 200 and other input information for controlling the operation of the driving portion 100. The circuit board 27 of the VCR 10 is further shown on FIGS. 1 and 2 to include a signal processing portion 400 by which video or other information signals recorded on, or reproduced from the tape 13 are suitably processed.

Figure 3:
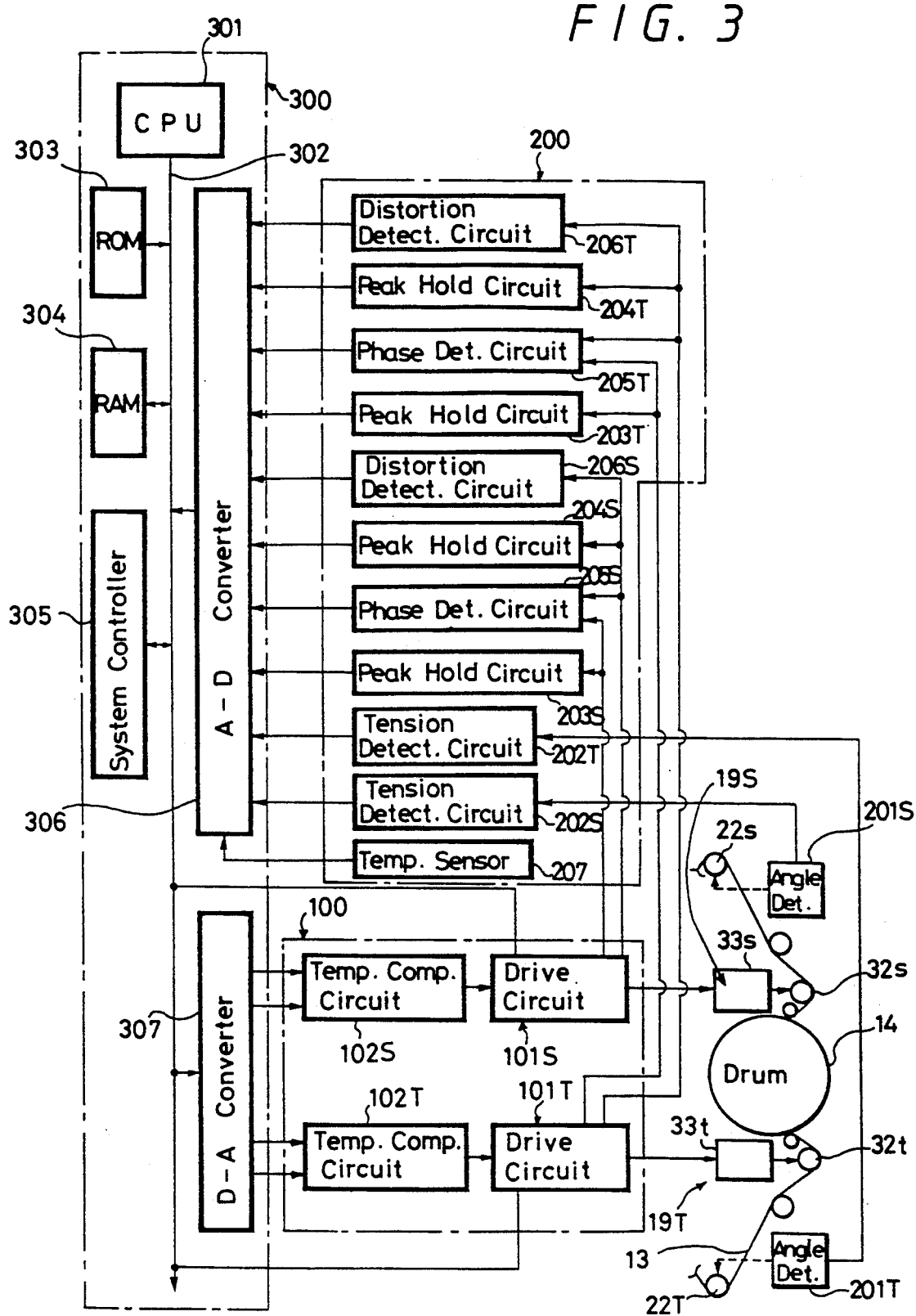
FIG. 3 is a block diagram illustrating a circuit arrangement for controlling operations of the apparatus of FIGS. and 2 in accordance with an embodiment of this invention.

Referring now to FIG. 3, it will be seen that the driving portion 100 generally comprises drive circuits 101S and 101T for providing respective ultrasonic drive signals to the vibrators 33s and 33t of the vibrated tape guiding devices 19S and 19T, respectively. The driving portion 100 is further shown to comprise temperature compensating circuits 102S and 102T through which the frequencies of the drive signals provided by the drive circuits 101S and 101T are respectively controlled.

The control portion 300 is shown to include a central processing unit (CPU) 301, a bus 302 formed of a data bus, address bus and control bus, a read only memory (ROM) 303, a random access memory (RAM) 304, a system controller 305, an analog-to-digital converter 306 and a digital-to-analog converter 307.

Each of the temperature compensation circuits 102S and 102T adds a temperature-dependent signal to a control signal fed thereto from the CPU 301 through the bus 302 and the D-A converter 307, and supplies the resulting temperature-compensated signal to the respective drive circuit 101S or 101T for determining the frequency of the drive signal supplied from such drive circuit to the respective ultrasonic vibrator 33s or 33t. Further, the drive circuits 101S and 101T control the gain or amplitude of the drive signal supplied to the ultrasonic vibrators 33s and 33t, respectively, in response to gain control data supplied to the drive circuits 101S and 101T through the bus 302 from the CPU 301.

Movement detecting devices 201S and 201T detect the amounts of movement of the tape tensioning guides 22S and 22T, respectively, resulting from changes in the tension in the tape 13 at the portions thereof engaged with the tape tensioning guides 22S and 22T, respectively. Signals representing the detected movements of the tape tensioning guides 22S and 22T are supplied from the detecting devices 201S and 201T to tension detecting circuits 202S and 202T, respectively, in the detecting portion 200. The tension detecting circuits 202S and 202T convert the signals representing detected movements of the tape tensioning guides into respective detected tension signals which are supplied to the CPU 301 through the A-D converter 306 and the bus 302.

The detecting portion 200 is further shown to include peak holding circuits 203S and 203T connected with the drive circuits 101S and 101T, respectively, and being operative to produce substantially DC current signals on the basis of the drive signals supplied by the drive circuits 101S and 101T t o the vibrators of the tape guiding devices 19S and 19T, respectively. The substantially DC current signals produced by the peak hold circuits 203S and 203T are supplied to the CPU 301 through the A-D converter 306 and the bus 302 for use in controlling the power of the drive signals, as will be later described in detail.

Also included in the detecting portion 200 are peak hold circuits 204S and 204T connected with the drive circuits 101S. and 101T, respectively, and which produce substantially DC voltage signals on the basis of the drive signals supplied to the vibrators of the tape guiding devices 19S and 19T, respectively. The voltage signals produced by the peak hold circuits 204S and 204T are supplied to the CPU 301 through the A-D converter 306 and the bus 302 for use in effecting power control and temperature compensation, as will be later described in detail.

Phase detecting circuits 205S and 205T in the detecting portion 200 are connected with the drive circuits 101S and 101T, respectively, and are operative to detect the phase differences between the voltage and the current of the drive signals supplied from the drive circuits 101S and 101T to the vibrators of :he tape guiding devices 19S and 19T, respectively. Further, the phase detecting circuits 205S and 205T supply signals corresponding to the respective detected phase differences to the CPU 301 through the A-D converter 306 and the bus 103 for use in effecting power control, as hereinafter described.

Distortion detecting circuit 206S and 206T in the detecting portion 200 are connected with the drive circuits 101S and 101T and produce respective substantially DC voltage signals indicating abnormalities or distortions in the drive signals supplied from circuits 101S and 101T to the vibrators of the tape guiding devices 19S and 19T, respectively. The substantially DC voltage signals produced by the detecting circuits 206S and 206T are supplied to the CPU 301 through the A-D converter 306 and the bus 302 for use in determining whether defects have occurred in the tape guiding devices 19S and 19T that would account for the distortions, as hereinafter described.

The detecting portion 200 of the circuit board 27 is completed by a temperature sensor or detector 207 which provides a signal corresponding to the sensed temperature supplied through the A-D converter 306 and the bus 302 to the CPU 301.

As earlier noted, the tape guiding devices 19S and 19T are most efficiently operated when the drive signals supplied thereto from the drive circuits 101S and 101T have frequencies corresponding to the resonant frequency of the guide element 32 which is to be vibrated, for example, a frequency of 150 KHz±5 to 10 KHz. The resonant frequency corresponds to the maximum impedance point because the driving of the vibrator is controlled by current and, therefore, the higher the impedance, the less current is needed for the generation of large power. As shown on FIG. 12, it has been confirmed that the resonant frequency changes with changes in temperature, for example, about 9 Hz for each degree centigrade. If control is effected for maintaining a constant frequency of the drive signal while the impedance changes with changes of temperature, a constant power output will not be obtained, for example, as is desired during a recording or reproducing operation with the tape being driven at a normal speed.

Figure 9:
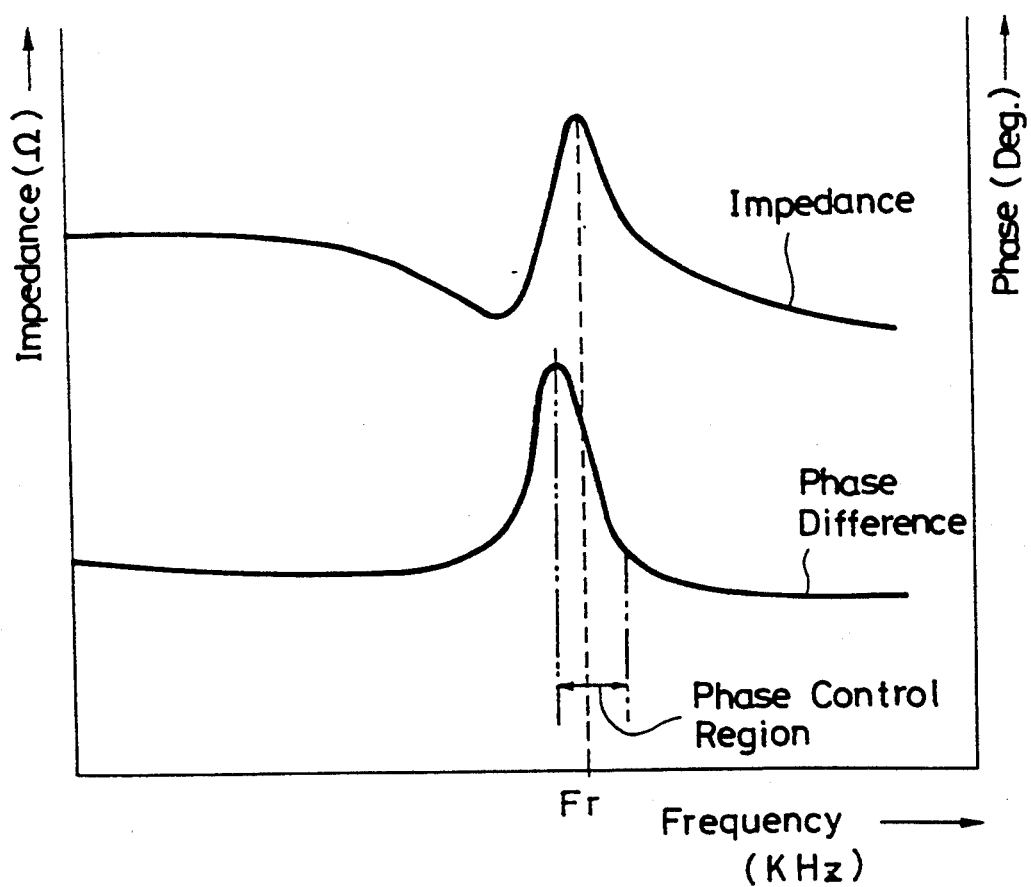
FIG. 9 is a graph showing changes in impedance and phase with frequency, and to which reference will be made in explaining the operation of the circuit shown in FIG. 4.

As shown in FIG. 9, the highest impedance occurs at the resonant frequency Fr. Further, the phase difference between the current and the voltage of the ultrasonic drive signal suddenly increases at about the resonant frequency, and the correlation between the resonant frequency and the frequency of maximum phase difference is substantially constant without regard to changes in temperature. The region from the frequency at which the peak of the phase difference occurs to a higher frequency at which the phase difference becomes substantially constant is defined as a phase-control region within which the phase-difference is controlled so as to maintain a constant value of the impedance.

In the embodiment of the invention being described, so-called frequency scanning is employed for initially detected the resonant frequency of the guide element 32 of the tape guiding device 19T or 19S when such tape guiding device is exchanged or initially used. Such frequency scanning involves sweeping or progressively changing the vibration frequency while employing a constant driving current for the vibrator 33, and detecting the driving voltage during such sweeping of the frequency. Such detected driving voltage will change in accordance with the change of impedance and will reach a maximum at the resonant frequency. Thus, the resonant frequency can be detected by searching for the maximum driving voltage.

The frequency scanning and subsequent phase control are effected by means of the phase detecting circuits 205S and 205T which may be each arranged as shown in FIG. 10. More particularly, each of the phase detecting circuits 205S and 205T is shown to include an amplifier 208 having one input connected with one of the leads connecting the driving circuit 101S or 101T with the ultrasonic vibrator 33 of the tape guiding device 19S or 19T, respectively. The other input terminal of the amplifier 208 is connected to the other one of the leads connecting the driving circuit 101S or 101T with the ultrasonic vibrator 33. Thus, a voltage signal is extracted from the drive signal provided by the driving circuit 101S or 101T and is supplied to a pulse generator 209. The pulse generator 209 is responsive to the sine-wave voltage signal from the amplifier 208 to produce a rectangular voltage signal which is supplied to one input of a phase detector 210. Another amplifier 211 has its two input terminals connected to the opposite ends of a resistor 212 which is connected between the driving circuit 101S or 101T and the respective ultrasonic vibrator 33. Thus, the drive signal from the driving circuit 101S or 101T is extracted as a sine-wave current signal which is supplied to a pulse generator 213. The pulse generator 213 is responsive to the sine-wave current signal from the amplifier 211 to produce a rectangular voltage signal which is supplied to another input of the phase detector 210. The phase detector 210 detects the phase difference between the rectangular voltage signals from the pulse generators 209 and 213, respectively, and supplies a corresponding detected phase difference signal through a low pass filter 214 to the A/D converter 306 of the control portion 300.

Figure 11:
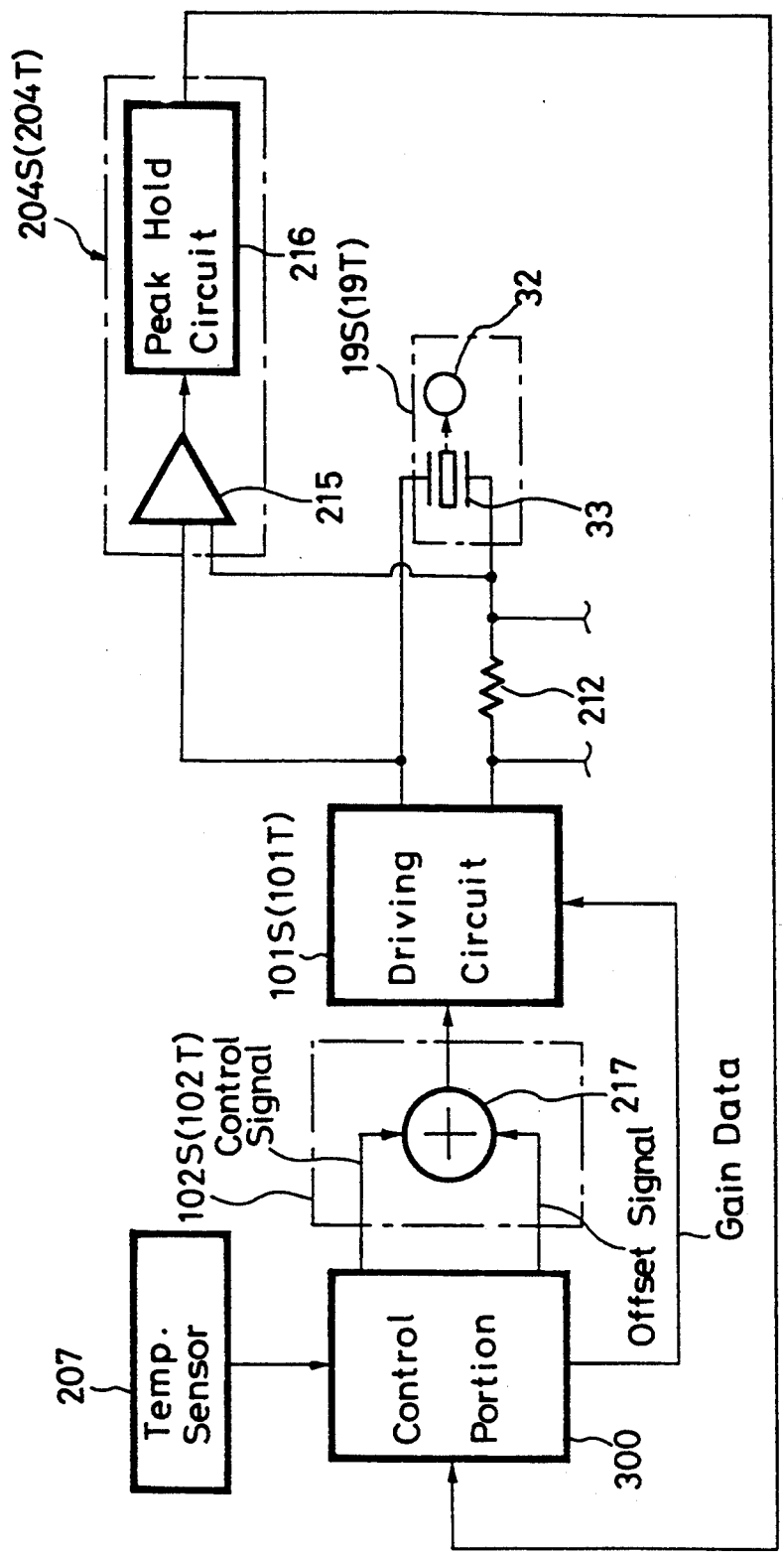
FIG. 11 is a block diagram showing details of a temperature compensation circuit that may be employed in the circuit of FIG. 4.

As further shown on FIG. 10, the peak hold circuit 204S or 204T includes an amplifier 215 connected in parallel with the amplifier 208 so as to extract a sine-wave voltage signal from the drive signal provided by the driving circuit 101S or 101T, and such voltage signal is supplied to a peak hold circuit 216. The resulting substantially DC voltage signal is supplied from the peak hold circuit 216 to the control portion 300 and, when such voltage signal from the peak hold circuit 216 is at a maximum, the control portion 300 stores so-called offset data corresponding to the detected phase difference signal from low pass filter 214 and temperature data from the temperature sensor 207. During such detection of the maximum driving voltage the gain data from the control portion 300 to the driving circuit 101S or 101T is maintained constant, and the control portion 300 further supplies the offset signal corresponding to the detected phase difference signal and the control signal for controlling the phase difference to the temperature compensation circuit 102S or 102T which, as hereinafter described with reference to FIG. 11, provides a suitable frequency control signal to the driving circuit 101S or 101T.

The manner in which temperature compensation is effected will now be described with reference to FIG. 11 in which each of the temperature compensation circuits 102S and 102T is shown to comprise an adder 217 which adds the offset signal and control signal received from the control portion 300 to provide an added output supplied to the driving circuit 101S or 101T as a frequency control signal for the latter. Once again, the amplifier 215 extracts a sine-wave voltage signal from the drive signal provided by the driving circuit 101S or 101T, and the peak hold circuit 216 changes such sine-wave voltage signal into a substantially DC voltage signal which is supplied to the control portion 300. The control portion 300 changes the offset signal and the control signal supplied to the adder 217 on the basis of temperature data from the temperature sensor 207. Although FIG. 12 shows the resonant frequency varying over the range of 149.85 KHz to 150.4 KHz for temperature changes between −10° and +50° centigrade, an apparatus embodying the present invention has been well able to compensate for changes in the resonant frequency due to temperature changes over the range of −20° centigrade to +80° centigrade. Therefore, the tape guiding devices 19S and 19T can always be efficiently driven even when substantially heated in response to the vibration of the guide elements 32.

A frequency scanning and temperature compensation operation of the VCR 10 embodying the present invention will now be described with reference to the flow chart of FIG. 13.

In the first step 500 following the start, the control portion 300 sets predetermined gain data for establishing a desired level of the drive signal power during frequency scanning. In other words, the drive signal supplied from the driving circuit 101S or 101T to the ultrasonic vibrator 33 of the tape guiding device 19S or 19T is provided with a constant power level during frequency scanning. After the gain data has been set, the program proceeds to step 501 in which the temperature is detected from the temperature data provided by the sensor 207. Then the program goes to step 502 in which the control data is compensated for any change due to the sensed temperature, that is, the control data or signal fed to the adder 217 is changed in accordance with the detected temperature data, whereupon, the program advances to step 503.

At step 503, the control data is set in accordance with the temperature compensation and the program proceeds to step 504 in which frequency scanning is effected, that is, the frequency of the drive signal supplied to the vibrator 33 is progressively varied while detecting the DC voltage signal from the peak hold circuit 204S or 204T for determining the resonance frequency therefrom.

In the next step 506, the offset data corresponding to the resonant frequency at which the driving voltage is a maximum, and a frequency scan end flag indicating an end to the scanning at such resonant frequency are stored by the control portion 300.

Then, the program proceeds successively to step 507, in which the gain data are reset, and then to step 508, in which the control data are reset, whereupon the program ends.

In accordance with the program described with reference to FIG. 13, the control data is changed in accordance with changes in temperature during the frequency scanning and, therefore, offset data at the normal temperature can be obtained. Furthermore, in accordance with the program of FIG. 13, the control portion 300 stores only the offset data and the frequency scan end flag at the step 506 and thereafter, that is, immediately after the frequency scanning, the phase control can be performed.

Another program for effecting the frequency scanning will now be described with reference to FIG. 14 which shows that, in the first step 600 after the start, gain data is set, that is, the control portion 300 sets predetermined data for the frequency scanning operation, and by which a constant power level of the drive signal fed from the driving circuit 101S or 101T to the respective ultrasonic vibrator 33 is maintained.

Then the program proceeds to a step 601 in which the frequency scanning is carried out.

In the next step 602, when the driving voltage is detected to be at a maximum value, that is, when the resonant frequency is arrived at during the frequency scanning, the control portion 300 stores the offset data corresponding to the resonant frequency, the temperature data from the sensor 207, and the frequency scan end flag.

The program then advances to step 603 in which the gain data is reset, and then the program ends.

In the embodiment described above with reference to FIG. 14, the control portion 300 stores the temperature data obtained during the frequency scanning in addition to the offset data, as indicated in step 602, and, at a later time when performing phase control, the control portion 300 calculates the difference between the temperature sensed when performing phase control and the temperature represented by the data stored during frequency scanning, and compensates the offset data for any difference between the two temperatures. Therefore, the procedure described with reference to FIG. 14 can effect phase control over any range. It will be appreciated that the procedure described above with reference to FIG. 13 differs from that described with reference to FIG. 14 in that temperature compensation is effected during frequency scanning in the procedure shown in FIG. 13, for example, as in step 502, whereas temperature compensation is effected during phase control, that is, after the procedure described with reference to FIG. 14.

Figure 13:
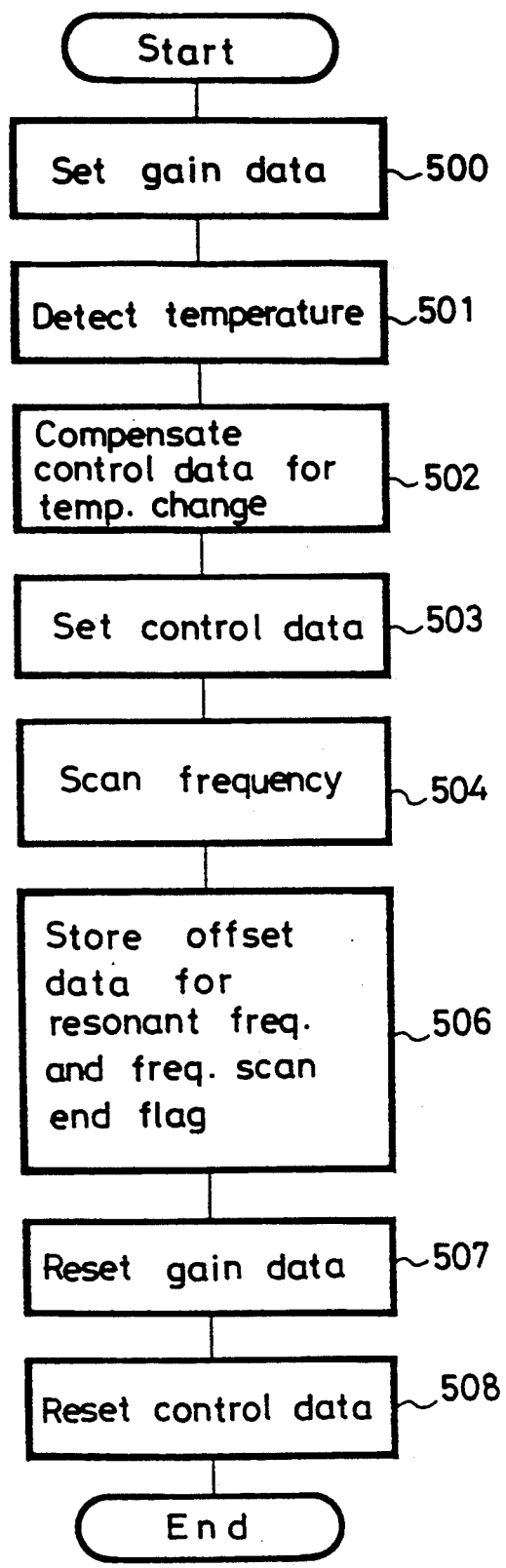
FIGS. 13 and 14 are flow charts illustrating programs by which an apparatus having a circuit arrangement as shown in FIG. 3, can initially determine a resonant frequency of an associated guide element in accordance with respective embodiments of this invention.
Figure 14:
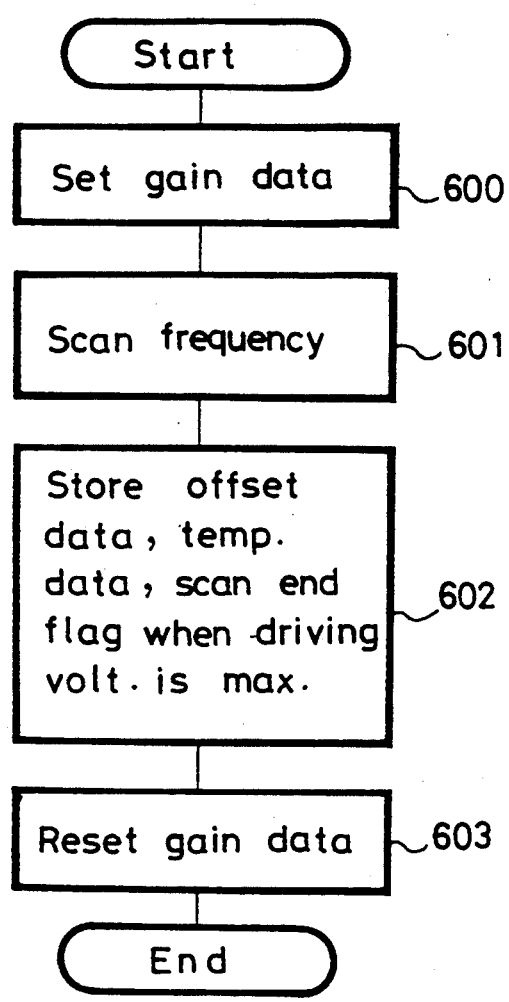

It will be appreciated that, in either case, that is, when employing the program of FIG. 13 or the program of FIG. 14, frequency scanning is performed only once, that is, when the tape guiding devices 19S and 19T are initially used or replaced. Thereafter, phase control can be performed immediately. When effecting phase control after frequency scanning, the detected phase difference signal from the detector 210 is supplied through the low pass filter 214 to the control portion 300 (FIG. 10). The control portion 300 responds to such input signal to change the control signal supplied to the driving circuit 101S or 101T, with the result that it is always possible to drive the tape guide element 32 at its resonant frequency, and hence with high efficiency.

Power control of each of the driving circuits 101S and 101T will now be described in detail with reference to FIG. 4 in which each of such driving circuits is shown to include a voltage-controlled oscillator (VCO) 218 which oscillates at a frequency determined by a voltage signal supplied from the respective temperature compensating circuit 102S or 102T, and which, as shown on FIG. 11, is the sum of the control signal and the offset signal supplied by the control portion 300. The drive circuit 101S or 101T further includes a gain controller 219 which receives the oscillation sine-wave signal from the VCO 218 and changes the gain thereof in accordance with gain data from the control portion 300. An amplifier 220 receives the sine-wave signal from the gain controller 219 and amplifies the same to provide the drive signal which is supplied to the ultrasonic vibrator 33 of the respective tape guiding device 19S or 19T for driving the latter.

As previously described with reference to FIG. 10, the peak hold circuit 204S or 204T which includes the amplifier 215 and the peak hold circuit 216 is operative to extract a voltage signal from the driving signal output by the amplifier 220, and the peak hold circuit 216 converts the sine-wave voltage signal from the amplifier 215 into a substantially DC voltage signal which is supplied to the control portion 300.

Figure 4:
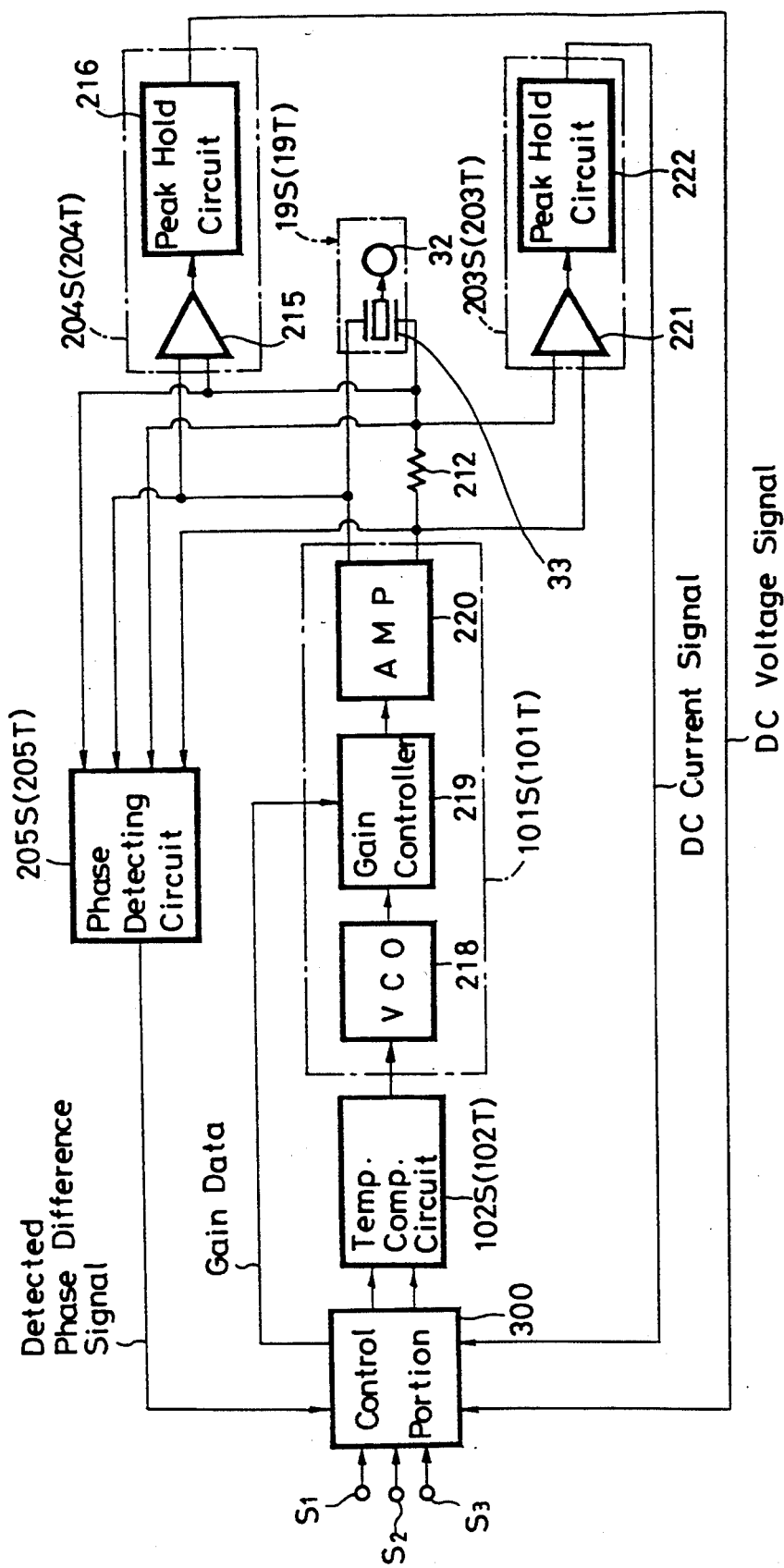
FIG. 4 is a more detailed block diagram of a portion of the circuit arrangement shown in FIG. 3.

As further shown on FIG. 4, the peak hold circuit 203S or 203T includes an amplifier 221 having its input terminals connected to opposite ends of the resistor 212, so that amplifier 221 extracts a sine-wave current signal from the drive signal being supplied from the driving circuit 101S or 101T to the ultrasonic vibrator 33. Such sine-wave current signal is supplied from the amplifier 221 to a peak hold circuit 222 which converts the same into a substantially DC current signal supplied to the control portion 300. The phase detecting circuit 205S or 205T having the arrangement described above with reference to FIG. 10, is also shown on FIG. 4 to provide to the control portion 300 a detected phase difference signal, that is, a signal indicating the difference between the current and voltage signals extracted from the drive signal. The control portion 300 is responsive to such detected phase difference signal from the phase detecting circuit 205S or 205T, the DC voltage signal from the peak hold circuit 204S or 204T and the DC current signal from the peak hold circuit 203S or 203T to obtain therefrom the effective power for driving the tape guiding device 19S or 19T which is determined by $V \times I \times \cos \Theta$, where V and I are the voltage and current signals derived from the drive signal and $\Theta$ is the phase difference between the voltage and current signals.

The control portion 300 is further shown to receive a signal $S_1$ which is suitably generated, for example, in response to actuation of a corresponding switch, and which represents the selected operating mode of the VCR 10, a signal $S_2$ which varies with the actual tape speed, and a signal $S_3$ which varies with the tape tension as indicated by the tension detecting circuit 202S or 202T (FIG. 3). The control portion 300 is responsive to the signals $S_1$, $S_2$ and $S_3$ to discriminate between the various operating modes of the VCR, such as, the so-called jog and shuttle modes, the normal recording and reproducing modes the fast-forward mode, the rewind mode and the like, and changes the gain data supplied to the gain controller 219 in accordance with such discrimination of the operating mode and the tape tension, as hereinafter described in detail.

Figure 15A:
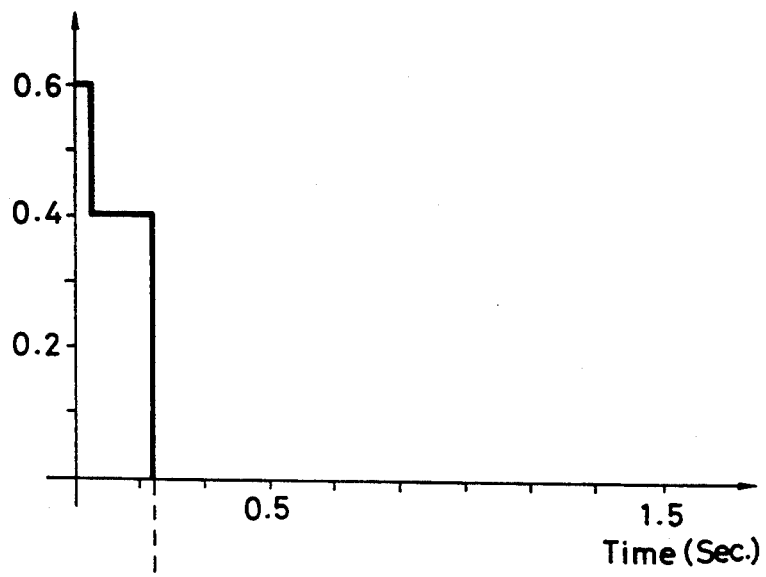
FIGS. 15A and 15B are graphs showing changes in power with time and changes in tape speed with time, respectively, and to which reference will be made in explaining operation of the apparatus according to this invention when in the fast-forward mode.
Figure 15B:
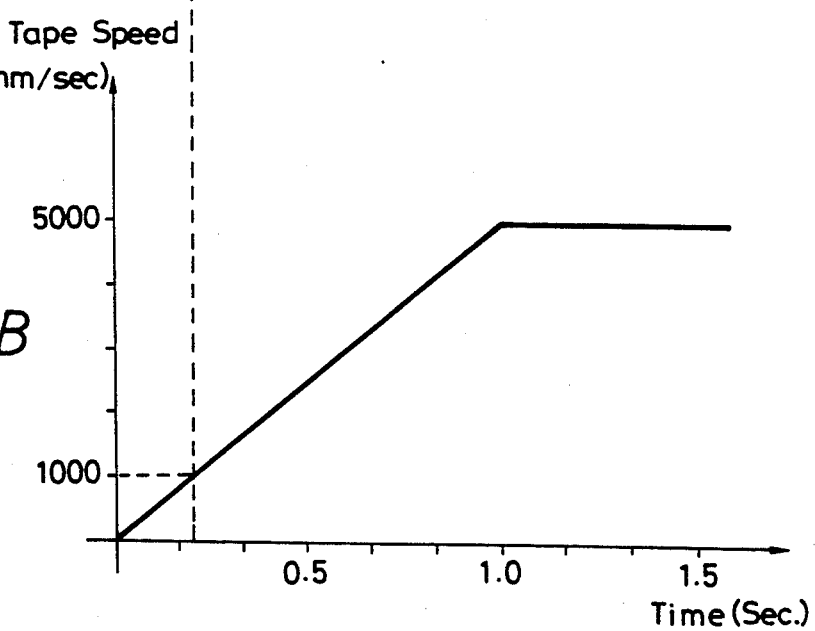

Referring now to FIGS. 15A and 15B, it will be seen that, upon the initiation of the operation of the VCR 10 in its fast-forward mode, the tape is accelerated over a time of approximately one second, from its condition of rest up to a tape speed of 5,000 mm/sec., whereupon such high tape speed is maintained substantially constant for the remainder of the operation in the fast-forward mode (FIG. 15B). In accordance with the present invention, and as shown on FIG. 15A, the power of the drive signal supplied from each of the driving circuits 101S and 101T to the respective ultrasonic vibrator 33 is increased to 0.6 W at the instant the movement of the tape is initiated and immediately thereafter is reduced to 0.4 W. Further, when the tape speed has reached approximately 1,000 mm/sec., the power of the drive signal is reduced to 0 W, that is, each of the driving circuits 101S and 101T is made inoperative. Such variation of the power with time is effected by suitable changes in the gain data provided from the control portion 300 to the gain controller 219 in response to the signals $S_1$ and $S_2$ representing the fast-forward mode of operation and the instantaneous tape speed, respectively.

It will be appreciated that the variation of power in accordance with changes in tape speed for the fast-forward mode of operation, as illustrated in FIGS. 15A and 15B, ensures that, at the initiation of the movement of the tape from a condition of rest, the imposition of a high frictional resistance to movement of the tape will be avoided. Further, as the tape accelerates in the relatively low-speed region, the power of the drive signal applied to each of the tape guiding devices 19S and 19T will be adequate to achieve the desired reduction in the frictional resistance to movement of the guiding tape. Furthermore, in the high speed region, that is, at tape speeds above 1,000 mm/sec., air is drawn in between the tape and the surface of each guide element 32 to provide an air film therebetween by which the frictional resistance to movement of the tape is adequately reduced. Therefore, the operation of the driving circuits 101S and 101T can be discontinued at tape speeds above 1,000 mm/sec., for avoiding wasteful consumption of energy. Thus, the power of each drive signal is controlled so as to obtain optimal reduction of the frictional resistance to movement of the tape while minimizing power consumption of the drive circuits 101S and 101T.

Figures 16A, 16B:
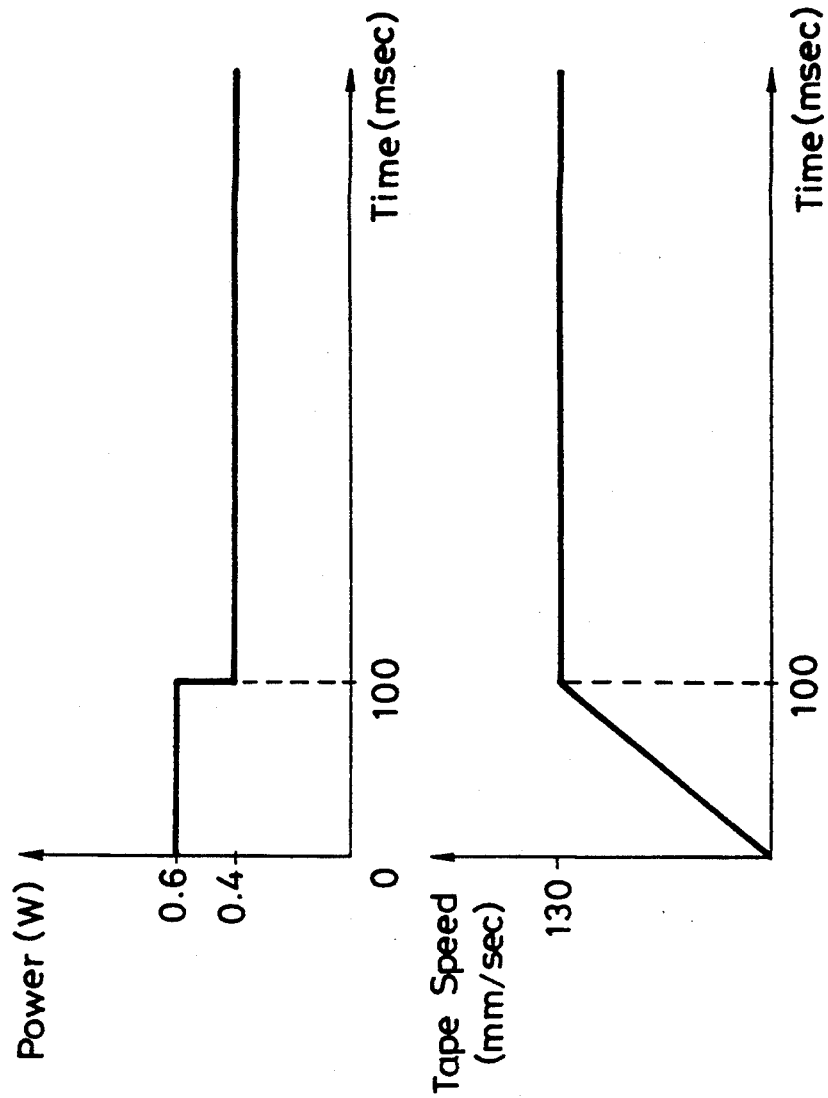
FIGS. 16A and 16B are graphs similar to FIGS. 15A and 15B, respectively, but illustrating the operation of the apparatus according to this invention when in its normal recording or reproducing mode.

Referring now to FIGS. 16A and 16B, it will be seen that, when the signal $S_1$ indicates that the normal recording or reproducing mode has been selected, the power of the drive signal supplied from each of the driving circuits 101S and 101T to the ultrasonic vibrator 33 of the respective tape guiding device 19S or 19T is raised to the level of 0.6 W during the initial time of 100 mm/sec., required for the acceleration of the tape from rest up to the normal speed of, for example, 130 mm/sec. Thereafter, the power is reduced to 0.4 W (FIG. 16A) and continues at that level while the tape speed is maintained at the normal value of 130 mm/sec. (FIG. 16B). Once again, the control portion 300 responds to the signals $S_1$ and $S_2$ to suitably change the gain data provided to the gain controller 219 of each of the drive circuits 101S and 101T so as to change the power level of the respective drive signal as described above with reference to FIGS. 16A and 16B. The increased power provided at the initiation of the tape movement avoids the abnormal tape tension usually generated when breaking free of the static frictional resistance to movement of the tape, and reduces the rise time, that is, the time required for acceleration of the tape from rest to its normal tape speed of 130 mm/sec., to about 1/10th of the 1,000 mm/sec. normally required in the prior art.

Figure 17:
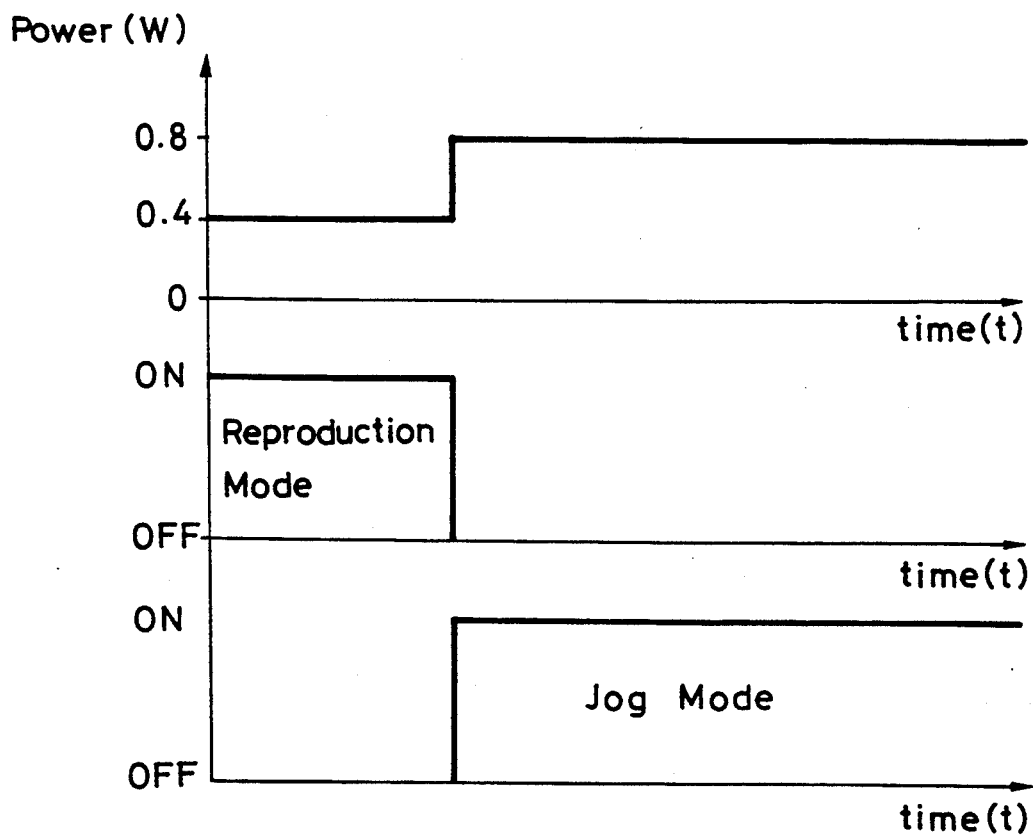
FIG. 17 is a graph illustrating the change in power with time when the apparatus according to this invention is changed-over from a normal reproduction mode to a jog mode.

Referring now to FIG. 17, it will be seen that, when the signal $S_1$ indicates a change-over of the operating mode from the normal reproducing or playback mode to the jog mode, the control portion 300 responds thereto by suitably changing the gain data so that the power of the drive signal from each of the driving circuits 101S and 101T is changed from 0.4 W, which is maintained for the normal reproducing mode, to 0.8 W which is maintained so long as the VCR 10 is in the jog mode. Such increased power ensures that the frictional resistance to movement of the tape will be sufficiently reduced when the tape speed is variously changed in the jog mode, thereby improving the response of the VCR to changing tape speed commands.

Power control using tape tension, as indicated by the signal $S_3$, as a parameter is employed in a reel mode that may be indicated by the signal $S_1$ and in which the tape 13 is transported by suitable rotation of the supply and take-up reels 12b and 12c, while the pinch roller 21 is spaced from the capstan 16 so that the tape is not driven by the capstan. In the foregoing situation, the power of each of the drive signals supplied from the driving circuits 101S and 101T to the ultrasonic vibrators 33 of the tape guiding devices 19S and 19T is suitable controlled so that a ratio of the tension values indicated by the tension detecting circuits 202S and 202T. and to which the signal $S_3$ corresponds, can be maintained constant. In connection with the foregoing, it will be appreciated that, by varying the power of the drive signals supplied from the driving circuit 101S or 101T to the ultrasonic vibrators 33 of the tape guiding device 19S and 19T, the frictional resistance to movement of the tape across the respective tape guiding elements 32 is correspondingly varied for changing the tension in the tape between the drum 14 and the supply reel and between the drum and the take-up reel, respectively.

It will be apparent that the ultrasonic vibrator 33 of each of the tape guiding devices 19S and 19T is subjected to severe operating conditions by being made to oscillate at the high resonant frequency of the respective tape guide element 32. As a result, the ultrasonic vibrators 33 may partially separate or peel away from the respective guide elements 32, or cracks or other defects may develop in the ultrasonic vibrators 33. Such defects, even initially, affect the vibration wave form of the guide element 32, but the reduction of the frictional resistance to the movement of the tape relative to the guide element 32 in response to operation of the respective ultrasonic vibrator 33 is not so greatly affected by initial changes in the vibration wave form. Therefore, the initiation of partial separation of the vibrator 33 from the guide element 32 or the appearance of cracks or other defects in the vibrator are difficult to detect from any resulting change in the resistance to movement of the tape.

However, when the ultrasonic vibrator 33 is partially peeled away from the respective guide element 32, or when cracks or other defects appear on the surfaces of the ultrasonic vibrator, the ultrasonic vibrator 33 produce a high-order harmonic oscillation and, as a result thereof, a distortion occurs in the voltage wave-form of the driving signal applied to the ultrasonic vibrator 33 from the driving circuit 101S or 101T. For example, as shown in FIG. 18, if one of the vibrators 33 begins to separate from the respective guide element 32, or begins to develop cracks or other defects in its surface, the drive signal from the respective driving circuit 101S or 101T, which normally has a spectrum concentrated near the resonant frequency Fr, will be distorted, that is, will include harmonic components at the second-order harmonic point (2Fr) and the third order harmonic point (3Fr) which are remote from the resonant frequency Fr.

In the illustrated embodiment of this invention, the distortion detecting circuits 206S and 206T (FIG. 3) are generally operative to detect the appearance of the above described second-order and third-order harmonic components in the drive signal from the respective driving circuits 101S and 101T, and thereby enable the mentioned defects to be detected at an early stage.

Figure 19:
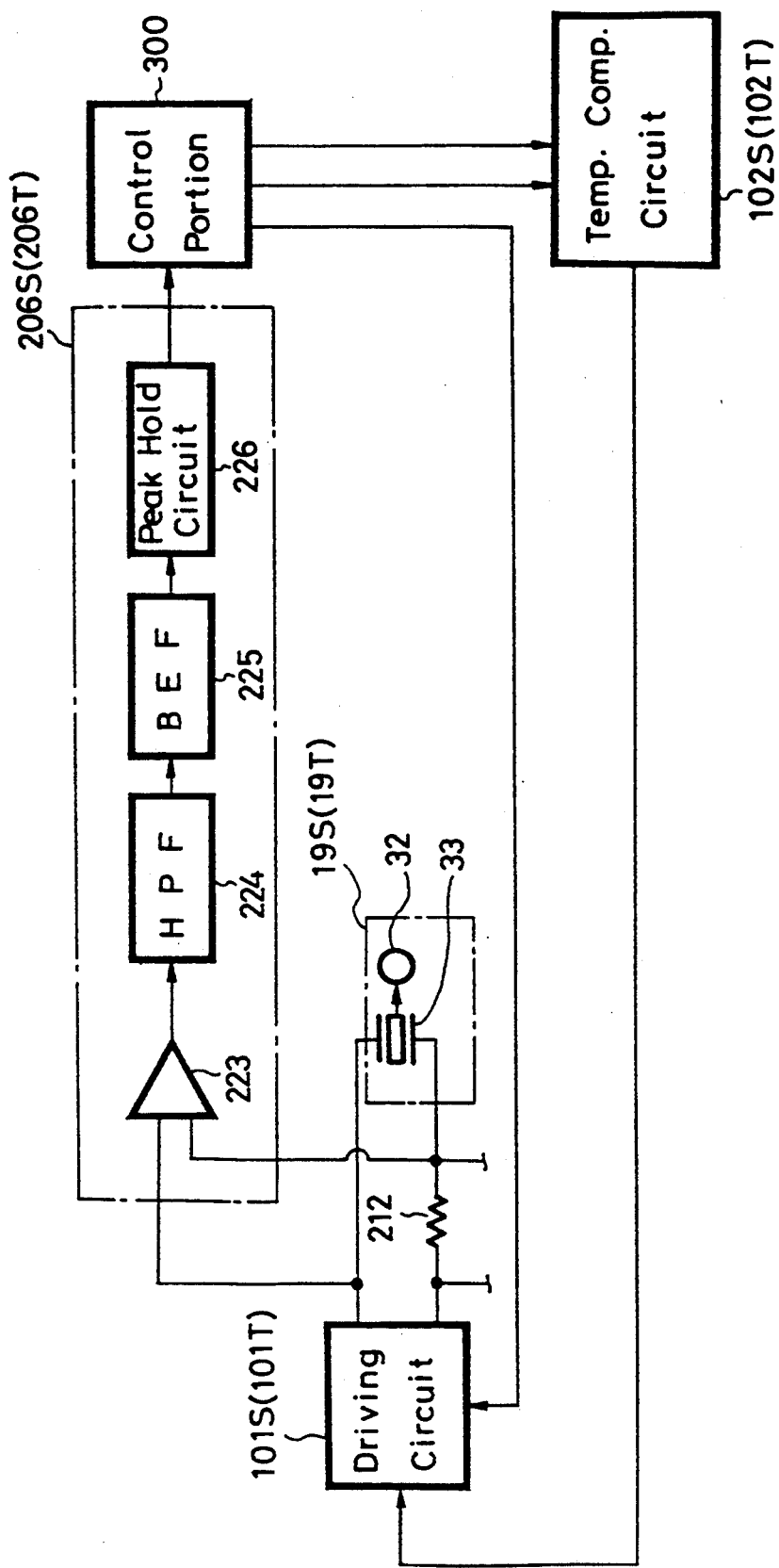
FIG. 19 is a block diagram showing a specific distortion detecting circuit that may be used in the circuit arrangement of FIG. 3 for determining abnormal operation of an ultrasonically vibrated tape guide device in accordance with the present invention.

More specifically, as shown on FIG. 19, each of the distortion detecting circuits 206S and 206T includes an amplifier 223 having input terminals connected to the conductors which connect the respective driving circuit 101S or 101T to the ultrasonic vibrator 33 of the respective tape guiding device 19S or 19T. Thus, the amplifier 223 extracts a sine-wave voltage signal from the drive signal provided by the respective driving circuit 101S or 101T, and such sine-wave voltage signal is supplied through a high-pass filter 224 and a band elimination filter 225 to a peak hold circuit 226. The high pass filter 224 and band elimination filter 225 are effective to remove, from the signal reaching the peak hold circuit 226, frequency components appearing below the dotted line on FIG. 18, and which include the resonant frequency component. The peak hold circuit 226 converts the voltage signal, from which the resonant frequency component has been extracted, into a substantially DC voltage signal which indicates the presence of the second and third order harmonics, that is, the presence of distortion, and which is supplied to the control portion 300. The control portion 300 determines whether or not distortion is present on the basis of the voltage signal received from the distortion detecting circuit 206S or 206T and may indicate the same on a suitable display (not shown). Since the presence or absence of the higher-order harmonic components within the drive signal is detected from a signal obtained by holding the peaks of the voltage signal derived from the drive signal and from which the resonant frequency component has been removed, the peeling off of the ultrasonic vibrator 33 from the respective guide element 32 or the occurrence of cracks of other defects on the surface of the ultrasonic vibrator 33 in either one of the tape guiding devices 19S and 19T can be detected at an early stage.

The detection of tape tension can also be employed for confirming an abnormality or defect in one or the other the tape guiding devices 19S and 19T or in its reduction of the frictional resistance to movement of the tape. As is apparent in FIG. 3, the tape tension can be detected in response to movements of the tape tensioning guides 22S and 22T determined by the respective movement detectors 201S and 201T, and the tension detecting circuit 202S and 202T which convert the detected movements into respective tension detecting signals supplied to the control portion 300. Such tension detection is performed when the VCR 10 is in its so-called reel mode, that is, when the pinch roller 21 is spaced from the capstan 16, and may be performed by the control portion 300 each time the power is turned on.

When the tape is being transported in the reel mode, the supply-side tension, that is, the tape tension between the drum 14 and the supply reel 12b, and the take-up side tension, that is, the tape tension between the take-up reel 12c and the drum 14, are definitely determinable from each other. For example, if the supply-side tension is a certain value while the tape is being transported in the forward direction, the take-up-side tape tension is the sum of the frictional resistances to movement of the tape between the tape tensioning guides 22S and 22T and at the rotary head drum 14 (FIGS. 2 and 3). Since an air film is established between the tape and the surface of the rotary head drum 14, the latter imposes a very small resistance to the movement of the tape with the result that, when the tape is transported in the forward direction in the reel mode, the tape tension is largely determined by the extent to which the tape guide devices 19S and 19T are operative to reduce the respective frictional resistances to movement of the tape.

Figure 20:
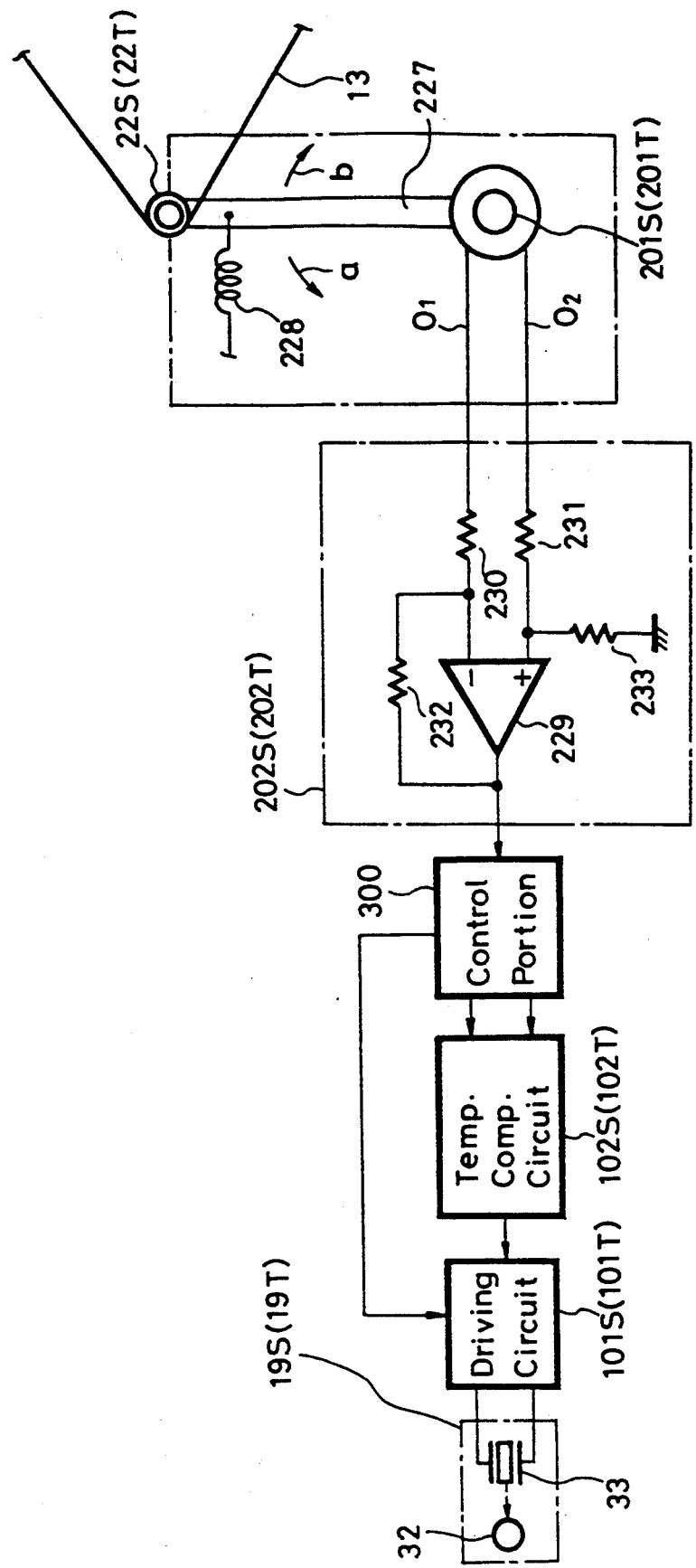
FIG. 20 is a block diagram showing details of a tension detecting circuit that may be employed in the circuit arrangement of FIG. 3 for sensing abnormal operation of an ultrasonically vibrated tape guide device in accordance with the present invention.

The manner in which tension is detected will now be further described with reference to FIG. 20 in which each of the tape tensioning guides 22S and 22T is shown to be mounted at one end of a respective support arm 227 which, at its other end, is pivoted for angular movements about an axis within the respective angular movement detector 201S or 201T, respectively. A spring 228 is connected to the angularly moveable arm 227 for urging the latter in the direction of the arrow a. Thus, in the event of a decrease in tension in the tape 13 engaged by the respective tensioning guide 22S or 22T, the spring 228 will angularly move the arm 227 in the direction of the arrow a, whereas an increase in the tape tension will cause movement of the arm 227 in the direction of the arrow b on FIG. 20. Each of the angular movement detectors 201S and 201T may be of a known magneto-sensitive type providing outputs 01 and 02 that differ from each other in dependence upon the angular position of the respective arm 227. Each of the tension detecting circuits 203S and 203T is shown to be formed as a differential amplifying circuit that includes an operational amplifier 229 having an inverting input terminal (−) to which the output 01 is supplied through a resistor 230, and a non-inverting input terminal (+) to which the output O₂ is supplied through a resistor 231. The inverting input terminal (−) of the operational amplifier 229 is also connected through a resistor 232 to the output terminal of the operational amplifier, and the non-inverting input terminal (+) of the operational amplifier is connected to ground through a resistor 233. The output of the operational amplifier 229 of each of the tension detecting circuits 203S and 203 constitutes a respective tension information signal which is supplied to the control portion 300.

Thus, the control portion 300 receives tension information signals from the tension detecting circuits 202S and 202T, that is, signals indicating the detected tape tension at the supply side and at the take-up side, respectively, and the control portion 300 produces corresponding tension ratios from which conditions of the tape guiding devices 19S and 19T can be determined. In other words, from ratios of the tension information signals obtained from the tension detecting circuits 202S and 202T, respectively, it can be decided whether or not the tape guiding devices 19S and 19T are operating normally to reduce the frictional resistance to movement of the tape therepast.

Figure 21B:
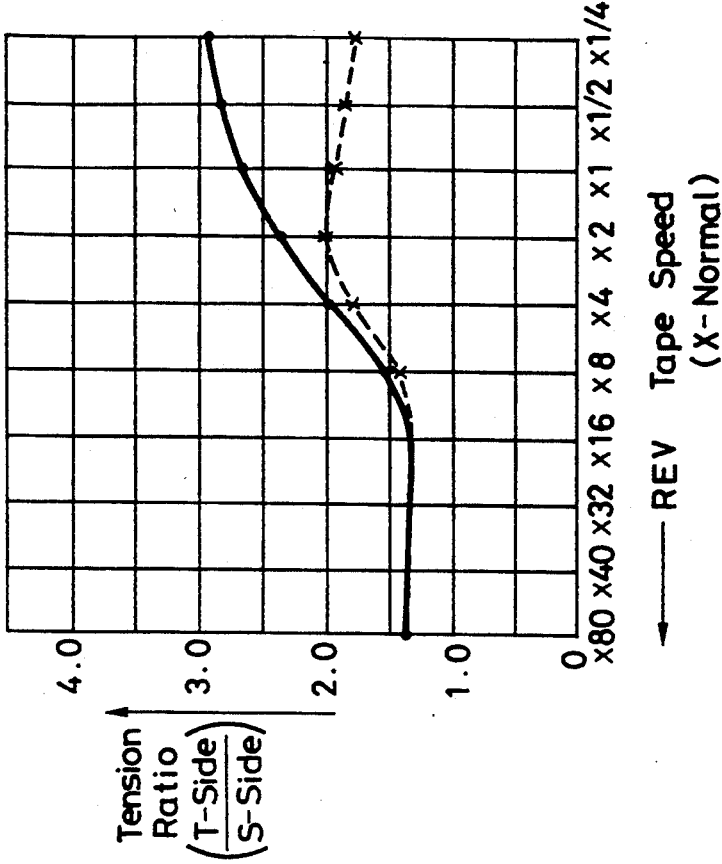
FIGS. 21A and 21B are graphs illustrating the relation of tension ratio to tape speed when the tape is driven in the forward and reverse directions, respectively, and to which reference will be made in explaining the use of such tension ratios for detecting abnormal operation or malfunction of an ultrasonically vibrated tape guide device in the apparatus according to the present invention.
Figure 21A:
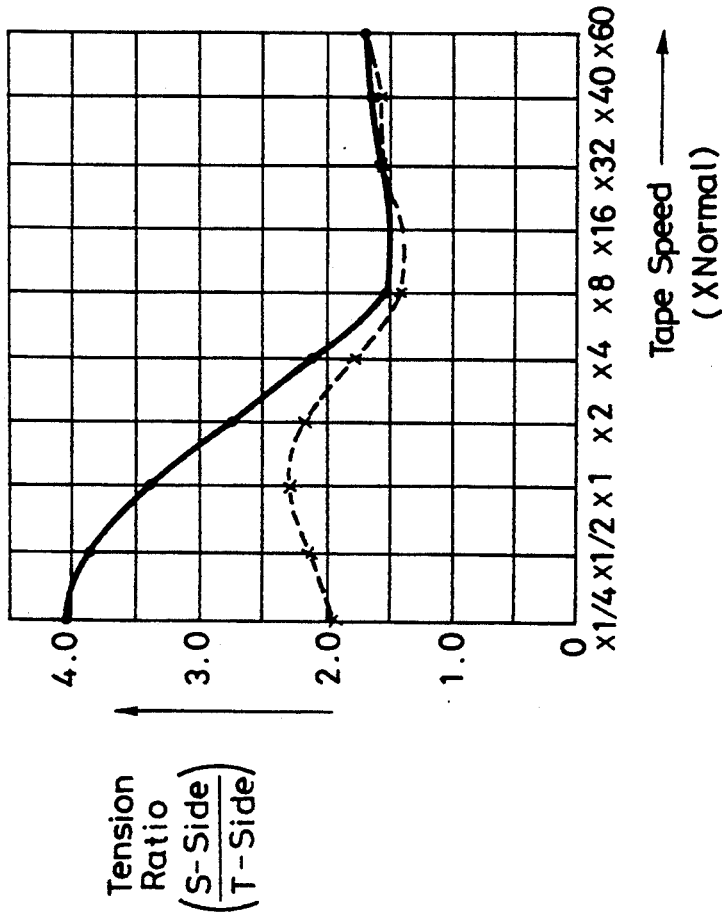

Referring now to FIGS. 21A and 21B, it will be seen that the ratio of the tape tension at the take-up side to the tape tension at the supply side, that is, the ratio T-side/S-side, when the tape is transported in the forward direction in the reel mode is shown on FIG. 21A, while the ratio of the supply-side tension to the take-side tension, that is, the ratio S-side/T-side when the tape is transported in the reverse direction in the reel mode is shown on FIG. 21B. In each of FIGS. 21A and 21B, the curves shown in dotted lines represent the respective tension ratios when the tape guiding devices 19S and 19T are normally operated by drive signals from the respective driving circuits 101S and 101T, while the curves shown in full lines show the tension ratios when the tape guiding devices 19S and 19T are not operated.

In the case of the described embodiment of the invention, it is assumed that the tape speed in the reel mode is abnormal or undesirable if the detected tension ratio is 3.0 or above. So long as the tape guiding devices 19S and 19T are being properly driven by the respective driving circuits 101S and 101T, the tape tension ratios for all tape speeds are shown to be below the value of 3.0, and all of the indicated tape speeds are acceptable. However, if the tape guiding devices 19S and 19T are inoperative, the tension ratio exceeds the value of 3.0 for any tape speed lower than about 1.5×the normal tape speed in the reel mode. In other words, in the absence of the operation of the tape guiding devices 19S and 19T, tape speeds in the forward direction of less than 1.5×the normal tape for the reel mode speed are considered abnormal speeds.

Therefore, whether the tape speed is abnormal, or whether the tape guiding devices 19S and 19T are providing the desired friction reducing effects can be readily confirmed by measuring the tape tensions at the supply-side and the take-up side by means of the angular movement detectors 201S and 201T and the associated tension detecting circuits 202S and 202T, calculating the respective tension ratios by means of the control portion 300, and then determining whether the tape speed is abnormal on the basis of such tension ratio. Moreover, by interrupting the operations of the drive circuits 101S and 101T so as to eliminate the friction reducing effects of the respective tape guiding devices 19S and 19T, slackness in the tape 13 can be substantially avoided when transporting of the tape in the reel mode is halted.

Figure 5:
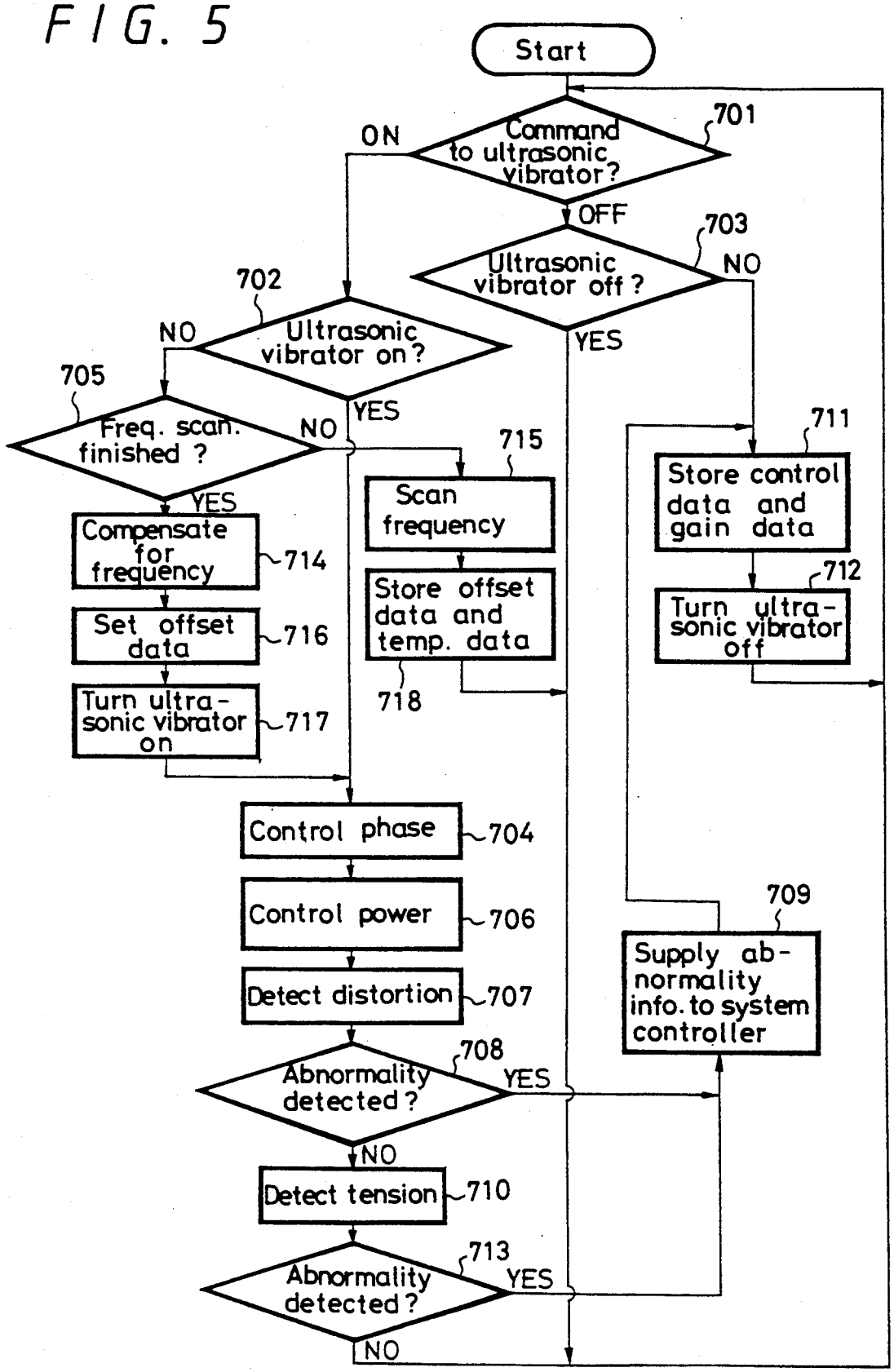
FIG. 5 is a flow chart to which reference will be made in explaining the operation of the circuit arrangement of FIG. 3 in accordance with this invention.

The operation of the tape guiding system, as a whole, in accordance with this invention will now be described with reference to the flow chart of FIG. 5. At step 701 after the start, the system controller 305 determines whether the command to the driving circuits 101S and 101T for energizing the ultrasonic vibrators 33 is "ON" or "OFF". If the command is determined to be "ON", the program goes to step 702. If the command is determined to be "OFF", the program advances to step 703.

At step 702, it is decides whether or not the ultrasonic vibrators 33 are actually "ON". If the decision at step 702 is "YES", the program goes to step 704 and, if the decision is "NO" the program advances to step 705.

At step 704, phase control is performed by means of the phase detecting circuits 205S and 205T previously described with reference to FIG. 10, and then the program goes to step 706.

At step 706, power control is performed as previously described with reference to the circuit arrangement in FIG. 4, and then the program advances to step 707.

At step 707, distortion detection is effected by means of the distortion detecting circuits 121S and 121T as described previously with reference to FIG. 19 for determining whether there is any defect in the ultrasonic generators 33 or in the attachment thereof to the respective tape guide elements 32. Then the program goes to step 708.

At step 708, it is decided whether or not the distortion, if any, detected in step 707 indicates any abnormality. If the decision in step 708 is "YES", the program goes to step 709. If the decision in step 708 is "NO", the program advances to step 710.

At step 709, information concerning the detected abnormality is supplied to the system controller 305 and, through the latter, to a display (not shown) for indication on the latter. Then the program goes to step 711. At step 711, the control data and gain data are stored in the RAM 304, and then the program goes to step 712.

At step 712, the ultrasonic vibrators 33 of the tape guiding devices 19S and 19T are rendered inoperative, that is, the respective driving circuits 101S and 101T are turned OFF, and the program returns to step 701.

If no abnormality is detected at step 708, the program goes to step 710 in which tape tensions are detected by means of the tension detecting circuits 202S and 202T and the associated angular motion detectors 201S and 201T, as previously described with reference to FIG. 20 and FIGS. 21A and 21B. Then the program advances to step 713.

At step 713, it is decided whether or not there is any abnormality in the detected tension ratio If the decision is "YES", the program returns to step 709. If the decision at step 713 is "NO", the program returns to step 701.

If the decision is "NO" at step 702, that is, the ultrasonic vibrators are not operating contrary to the command therefor, the program advances to step 705 at which it is decided whether or not the frequency scanning operation has been completed. If the decision at step 705 is "YES", the program goes to step 714. If the decision at step 705 is "NO", the program advances to step 715.

At step 714, frequency compensation is performed, for example, as described above with reference to FIG. 11, and then the program goes to step 716.

At step 716, the corresponding offset data is set, and then the program proceeds to step 717.

At step 717, the ultrasonic vibrators 33 are turned ON or energized by the respective driving circuits 101S and 101T, and then the program goes to step 704.

At step 715 frequency scanning is performed by means of the phase detecting circuits 205S and 205T, the temperature detector or sensor 207 and the temperature compensation circuits 102S and 102T, and then the program advances to step 718.

At step 718, the offset data and temperature data are stored in the RAM 304, and then the program returns to step 701.

If, at step 701, the decision is "OFF", the program goes to step 703 at which it is decides whether or not the ultrasonic vibrators 33 are operating. If the decision at step 703 is "YES", the program again returns to step 701. If the decision is "NO" at step 703, the program goes to step 711.

Thus, in the described embodiment of this invention, since the driving circuits 101S and 101T are controlled by the CPU 301 so that the voltages of the drive signals to the ultrasonic vibrators 33 can be changed for the various operating modes of the VCR 10, or in accordance with the conditions of such apparatus, the tape tension can be maintained at optimum values, and the friction reducing tape guiding devices 19S and 19T can be efficiently operated with relatively small power consumption.

Although specific embodiments of the invention have been described herein with reference to the accompanying drawings, it is to be understood that the invention is not limited to such precise embodiments, and that various changes and modifications may be effected therein by one skilled in the art without departing from the scope or spirit of the invention as defined in the appended claims.

What is claimed is:

1. An apparatus for recording and/or reproducing signals on a tape and which is selectively operative in a plurality of operating modes, said apparatus comprising:
    tape supply means and take-up means with a tape extending therebetween;
    tape drive means for longitudinally transporting said tape between said supply and take-up means at speeds determined in accordance with said operating modes;
    head means engageable with said tape between said supply and take-up means while the tape is being transported for recording and/or reproducing signals on the tape;
    guiding means for guiding the tape between said supply and take-up means including at least one guide element having a surface slidably engageable by the tape for guiding the latter, and ultrasonic oscillation generating means connected with said guide element and being operable for effecting ultrasonic vibration of the guide element so as to reduce frictional resistance to movement of the tape across said surface of the guide element;
    drive circuit means for supplying an ultrasonic sine-wave drive signal to said oscillation generating means for operating the latter; and
    control means for automatically controlling the power of said drive signal in accordance with one of said operating modes selected for operation of the apparatus so as to obtain optimal reduction of said frictional resistance to movement of the tape while minimizing power consumption of said drive circuit means.

2. The apparatus according to claim 1; in which said operating modes include normal recording and reproducing modes in each of which said tape drive means transports the tape at a relatively slow normal speed; and in which said control means establishes a relatively high level of said power upon initiation of either of said normal recording and reproducing modes and during acceleration of the tape up to said normal speed, and said control means reduces said power to a relatively lower level during the following transportation of the tape continuously at said normal speed.

3. The apparatus according to claim 2; in which said operating modes further include a jog mode; and in which said control means establishes another high level of said power upon change-over from said normal recording or reproducing mode to said jog mode.

4. The apparatus according to claim 3; in which said operating modes further include a fast-forward mode and a re-wind mode in each of which the tape is transported at a speed exceeding a speed at which an air film is formed between the tape and said surface of the guide element; and in which said control means establishes a relatively high level of said power upon initiation of either said fast-forward mode or said re-wind mode and then reduces said power during acceleration of the tape up to said speed at which said air film is formed, whereupon said drive circuit means is made ineffective to operate said oscillation generating means.

5. The apparatus according to claim 1; in which said operating modes include a fast-forward mode and a re-wind mode in each of which the tape is transported at a speed exceeding a speed at which an air film is formed between the tape and said surface of the tape guide element; and in which said control means establishes a relatively high level of said power upon initiation of either said fast-forward mode or said re-wind mode and the reduces said power during acceleration of the tape up to said speed at which said air film is formed, whereupon said drive circuit means is made ineffective to operate said oscillation generating means.

6. The apparatus according to claim 1; in which said drive circuit means includes a voltage-controlled oscillator providing an oscillation output at a frequency determined by a frequency control voltage, and gain control means acting on said oscillation output for determining the amplitude of said ultrasonic sine-wave drive signal produced therefrom in accordance with a gain control signal.

7. The apparatus according to claim 6; further comprising means for deriving voltage and current signals from said sine-wave drive signal; means for providing a phase signal representing a phase difference between said voltage and current signals; means detecting peak values of said voltage and current signals for providing substantially DC voltage and current signals; and means for applying said phase signal and DC voltage and current signals to said control means which determines said power of the drive signal therefrom.

8. The apparatus according to claim 6; in which said guide element has a predetermined resonant frequency, and said control means determines said frequency control voltage so that said voltage-controlled oscillator provides said oscillation output at said resonant frequency.

9. The apparatus according to claim 8; in which said control means is programmed to initially scan the frequency of said ultrasonic sine-wave drive signal for determining said resonant frequency when said DC voltage signal is at a maximum value.

10. The apparatus according to claim 8; further comprising temperature sensing means; and in which said control means includes temperature compensating means responsive to said temperature sensing means for changing said frequency control voltage in a sense to compensate for any change in said resonant frequency due to temperature changes.

11. The apparatus according to claim 1; in which said guide element has a predetermined resonant frequency, and said control means determines the frequency of said ultrasonic sine-wave drive signal to correspond to said resonant frequency.

12. The apparatus according to claim 11; in which said control means is programmed to initially scan the frequency of said ultrasonic sine-wave drive signal and determines said resonant frequency as the scanned frequency which corresponds to the maximum amplitude of said drive signal.

13. The apparatus according to claim 11; further comprising temperature sensing means to which said control means responds, and temperature compensating means controlled by said control means for changing the frequency of said ultrasonic sine-wave drive signal so as to correspond with any change in said resonant frequency resulting from a sensed temperature change.

14. The apparatus according to claim 1; further comprising means for detecting distortion of said drive signal as an indication of abnormal operation of said guiding means 15. The apparatus according to claim 14; in which said guide element has a predetermined resonant frequency, and said drive signal normally has said resonant frequency, and in which said means for detecting distortion includes means for providing a voltage signal corresponding to said drive signal, filter means for eliminating from said voltage signal a component in a band containing said resonant frequency, and means for detecting an output of said filter means as an indication of said abnormal operation.

16. The apparatus according to claim 1; in which said one guide element engages the tape between said supply means and a location along the tape where the latter is engageable by said head means; and in which said guiding means further includes a second guide element having a surface slidably engageable by the tape between said location along the latter and said take-up means, and second ultrasonic oscillation generating means connected with said second guide element and being operable for effecting ultrasonic vibration of said second guide element.

17. The apparatus according to claim 16; in which each of said guide elements has a standing wave oscillation generated therein by the respective oscillation generating means and is fixedly supported at nodes of said standing wave.

18. The apparatus according to claim 16; further comprising first and second means for detecting tensions in said tape between said one guide element and said supply means and between said second guide element and said take-up means, respectively; and in which said control means responds to differences between the tensions detected by said first and second means therefor which are abnormal for the selected operating mode as an indication of defective operation of said guiding means.

19. An apparatus for recording and/or reproducing signals on a tape, said apparatus comprising:
tape supply means and take-up means with a tape extending therebetween;
tape drive means for longitudinally transporting said tape between said supply and take-up means at various speeds;
head means engageable with said tape between said supply and take-up means while the tape is being transported for recording and/or reproducing signals on the tape;
guiding means for guiding the tape between said supply and take-up means including at least one guide element having a surface slidably engageable by the tape for guiding the latter, and ultrasonic oscillation generating means connected with said guide element and being operable for effecting ultrasonic vibration of the guide element so as to reduce frictional resistance to movement of the tape across said surface of the guide element;
drive circuit means for supplying an ultrasonic sine-wave drive signal to said oscillation generating means for operating the latter; and
control means for automatically controlling the power of said drive signal in accordance with the speed at which the tape is transported by tape drive means so as to obtain optimal reduction of said frictional resistance to movement of the tape while minimizing power consumption of said drive circuit means.

20. The apparatus according to claim 19; further comprising means for deriving voltage and current signals from said sine-wave drive signal; means for providing a phase signal representing a phase difference between said voltage signal and said current signal; means detecting peak values of said voltage signal and said current signal, respectively, for providing substantially DC voltage and current signals therefrom; and means for applying said phase signal and DC voltage and current signals to said control means which determines said power of the drive signal therefrom.

21. The apparatus according to claim 19; in which said guide element has a predetermined resonant frequency, and said control means controls said drive circuit means for causing said drive signal to have said resonant frequency.

22. The apparatus according to claim 21; further comprising temperature sensing means; and in which said control means includes temperature compensating means responsive to said temperature sensing means for changing the frequency of said drive signal in the sense to compensate for any change in said resonant frequency due to temperature changes.

23. The apparatus according to claim 19; further comprising means for detecting distortion of said drive signal as an indication, of abnormal operation of said guide means.

24. The apparatus according to claim 19; in which said one guide element engages the tape between said supply means and a location along the tape where the latter is engageable by said head means; and said guiding means further includes a second guide element having a surface slidably engageable by the tape between said location along the latter and said take-up means, and second ultrasonic oscillation generating means connected with said second guide element and being operable for effecting ultrasonic vibration of said second guide element; and further comprising first and second means for detecting tensions in said tape between said one guide element and said supply means and between said second guide element and said take-up means, respectively; said control means responding to abnormal differences between the tensions detected by said first and second means therefor as an indication of defective operation of said guiding means.

25. In an apparatus for recording and/or reproducing a signal on a tape which is driven at a speed dependent upon a selected operating mode while the tape is guided by a guide element connected to an ultrasonic oscillation generator which is operable for effecting ultrasonic vibration of the guide element so as to reduce frictional resistance to movement of the tape across the guide element, an operating circuit comprising:
- drive circuit means for supplying an ultrasonic sine-wave drive signal to said oscillation generator for operating the latter;
- detecting means for detecting peak values of voltage and current signals derived from said sine-wave drive signal, and a phase difference between said voltage and current signals; and
- control means responsive to the detected peak values of the voltage and current signal and the detected phase difference for determining the power of said drive signal therefrom.

26. An apparatus according to claim 25; in which said detecting means includes first and second pulse generators receiving said voltage and current signals, respectively, derived from said sine-wave drive signal and providing respective first and second rectangular-wave voltage signals, and phase comparing means detecting a phase difference between said first and second rectangular-wave voltage signals as an indication of said phase difference between said voltage and current signals derived from the drive signal.

27. An apparatus according to claim 25; in which said detecting means includes means for detecting tension in said tape while being driven, and said control means is responsive to the detected tension for sensing defective operation of said oscillation generator in effecting ultrasonic vibration of the guide element.

28. An apparatus according to claim 25; in which said detecting means includes means for detecting distortion of said drive signal, and said control means determines from detected distortion of said drive signal that said oscillation generator is defective in causing said ultrasonic vibration of the guide element.

29. An apparatus according to claim 25; in which said detecting means includes temperature detecting means, and said control means responds to changes in the detected temperature to cause said drive circuit means to effect compensating changes in the frequency of the ultrasonic vibration of said guide element.

30. The apparatus according to claim 25; in which said drive circuit means includes a voltage-controlled oscillator providing an oscillation output at a frequency determined by a frequency control voltage, means for providing said frequency control voltage in accordance with an offset signal from said control means, and gain control means acting on said oscillation output for determining the amplitude of said ultrasonic sine-wave drive signal produced therefrom in accordance with a gain control signal from said control means.

31. The apparatus according to claim 30; in which said guide element has a predetermined resonant frequency, and said control means determines said offset signal so that said voltage-controlled oscillator provides said oscillation output at said resonant frequency.

32. The apparatus according to claim 31; in which said control means is programmed to initially scan the frequency of said ultrasonic sine-wave drive signal for determining said resonant frequency when said DC voltage signal is at a maximum value.

33. The apparatus according to claim 31; in which said detecting means includes temperature sensing means, said means for providing said frequency control voltage includes compensation means, and said control means is responsive to said temperature sensing means for causing said compensation means to vary said frequency control voltage in a sense to compensate for any change in said resonant frequency due to temperature changes.

34. The apparatus according to claim 33; in which said control means includes bus means, an analog-to-digital converter through which said detecting means are connected with said bus means, a digital-to-analog converter through which said bus means are connected with said means for providing said frequency control voltage in said drive circuit means, a CPU, ROM, RAM and system controller connected through said bus means with said analog-to-digital converter and said digital-to-analog converter.

35. The apparatus according to claim 34; in which said drive circuit means includes a gain controller connected with said bus means for receiving a gain control signal from said control means.

36. An apparatus for recording and/or reproducing signals on a tape and which is selectively operative in a plurality of operating modes, said apparatus comprising:
- tape supply means and take-up means with a tape extending therebetween;
- tape drive means for longitudinally transporting said tape between said supply and take-up means at speeds determined in accordance with said operating modes;
- head means engageable with said tape between said supply and take-up means while the tape is being transported for recording and/or reproducing signals on the tape;
- guiding means for guiding the tape between said supply and take-up means including at least one guide element having a surface slidably engageable by the tape for guiding the latter, and ultrasonic oscillation generating means connected with said guide element and being operable for effecting ultrasonic vibration of the guide element so as to reduce frictional resistance of movement of the tape across said surface of the guide element;
- drive circuit means for supplying an ultrasonic sine-wave drive signal to said oscillation generating means for operating the latter;
- control means for controlling the power of said drive signal in accordance with one of said operating modes selected for operation of the apparatus so as to obtain optimal reduction of said frictional resistance to movement of the tape while minimizing power consumption of said drive circuit means, and
- means for detecting distortion of said drive signal as an indication of abnormal operation of said guiding means.

37. An apparatus for recording and/or reproducing signals on a tape, said apparatus comprising:

tape supply means take-up means with a tape extending therebetween;

tape drive means for longitudinally transporting said tape between said supply and take-up means at various speeds;

head means engageable with said tape between said supply and take-up means while the tape is being transported for recording and/or reproducing signals on the tape;

guiding means for guiding the tape between sand supply and take-up means including at least one guide element having a surface slidably engageable by the tape for guiding the latter, and ultrasonic oscillation generating means connected with said guide element and being operable for effecting ultrasonic vibration of the guide element so as to reduce frictional resistance to movement of the tape across said surface of the guide element;

drive circuit means for supplying an ultrasonic sine-wave drive signal to said oscillation generating means for operating the latter;

control means for controlling the power of said drive signal in accordance with the speed at which the tape is transported by tape drive means so as to obtain optimal reduction of said frictional resistance to movement of the tape while minimizing power consumption of said drive circuit means; and means for detecting distortion of said drive signal as an indication of abnormal operation of said guide means.

* * * * *